US012374770B2

(12) United States Patent
Wang et al.

(10) Patent No.: US 12,374,770 B2
(45) Date of Patent: Jul. 29, 2025

(54) BASE STATION ANTENNAS HAVING AN ACTIVE ANTENNA MODULE(S) AND RELATED MOUNTING SYSTEMS AND METHODS

(71) Applicant: Outdoor Wireless Networks LLC, Claremont, NC (US)

(72) Inventors: Dongmin Wang, Jiangsu (CN); Junfeng Yu, Jiangsu (CN); Shanguang Zhang, Jiangsu (CN); PuLiang Tang, Jiangsu (CN); ZhaoHui Liu, Jiangsu (CN); Xiaohua Tian, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 17/905,291

(22) PCT Filed: Sep. 22, 2021

(86) PCT No.: PCT/CN2021/119584
§ 371 (c)(1),
(2) Date: Mar. 30, 2023

(87) PCT Pub. No.: WO2023/044604
PCT Pub. Date: Mar. 30, 2023

(65) Prior Publication Data
US 2024/0213650 A1 Jun. 27, 2024

(51) Int. Cl.
*H01Q 1/12* (2006.01)
*H01Q 1/24* (2006.01)
*H01Q 23/00* (2006.01)

(52) U.S. Cl.
CPC ........... *H01Q 1/1228* (2013.01); *H01Q 1/246* (2013.01); *H01Q 23/00* (2013.01)

(58) Field of Classification Search
CPC ...... H01Q 1/12; H01Q 1/1207; H01Q 1/1228; H01Q 1/1242; H01Q 1/125; H01Q 1/1264;
(Continued)

(56) References Cited

U.S. PATENT DOCUMENTS

| | | | |
|---|---|---|---|
| 7,907,096 | B2 | 3/2011 | Timofeev et al. |
| 9,692,115 | B2 | 6/2017 | Rucki et al. |

(Continued)

FOREIGN PATENT DOCUMENTS

| | | | |
|---|---|---|---|
| CN | 216362158 | U | 4/2022 |
| WO | 2015095779 | A1 | 6/2015 |

(Continued)

OTHER PUBLICATIONS

Ben A. Munk, Frequency Selective Surfaces: Theory and Design, ISBN: 978-0-471-37047-5; DOI: 10.1002/0471723770; Apr. 2000, Copyright © 2000 John Wiley & Sons, Inc.

(Continued)

*Primary Examiner* — Robert Karacsony
(74) *Attorney, Agent, or Firm* — Myers Bigel, P.A.

(57) ABSTRACT

Base station antennas include an externally accessible active antenna module releasably coupled to a rear of the housing using a field installable mounting system/kit with a mounting frame and active antenna module mounting brackets. The base station antenna housing has a passive antenna assembly that cooperates with the active antenna module.

26 Claims, 25 Drawing Sheets

(58) Field of Classification Search
CPC ...... H01Q 1/246; H01Q 1/50; H01Q 3/02–10; H01Q 23/00
See application file for complete search history.

(56) References Cited

U.S. PATENT DOCUMENTS

| | | | | |
|---|---|---|---|---|
| 10,601,120 | B2 | 3/2020 | Bisiules et al. | |
| 10,978,840 | B2 | 4/2021 | Paynter et al. | |
| 11,552,408 | B2 | 1/2023 | Tang et al. | |
| 11,581,631 | B2 | 2/2023 | Li et al. | |
| 2010/0013729 | A1 | 1/2010 | Harel et al. | |
| 2010/0214190 | A1 | 8/2010 | Shin et al. | |
| 2014/0179244 | A1 | 6/2014 | Colapietro et al. | |
| 2014/0313095 | A1 | 10/2014 | Pu et al. | |
| 2015/0091777 | A1 | 4/2015 | Rucki et al. | |
| 2016/0365618 | A1 | 12/2016 | Kim et al. | |
| 2017/0222313 | A1 | 8/2017 | Markof et al. | |
| 2018/0337443 | A1 | 11/2018 | Bisiules et al. | |
| 2019/0312339 | A1 | 10/2019 | Fritze et al. | |
| 2020/0259248 | A1 | 8/2020 | Lv et al. | |
| 2021/0057796 | A1 | 2/2021 | Xu et al. | |
| 2021/0129276 | A1 | 5/2021 | Zhu et al. | |
| 2021/0218156 | A1 | 7/2021 | Patel et al. | |
| 2021/0242599 | A1 | 8/2021 | Deng et al. | |
| 2021/0305683 | A1 | 9/2021 | Hou et al. | |
| 2021/0305684 | A1 | 9/2021 | Hou et al. | |
| 2021/0305717 | A1* | 9/2021 | Hou | H01Q 15/23 |
| 2021/0336331 | A1 | 10/2021 | Rai et al. | |
| 2021/0384616 | A1 | 12/2021 | Patel et al. | |
| 2021/0384641 | A1 | 12/2021 | Tang et al. | |
| 2022/0094051 | A1 | 3/2022 | Ameer P et al. | |
| 2022/0393339 | A1 | 12/2022 | Soni | |
| 2022/0407240 | A1 | 12/2022 | Bisiules et al. | |
| 2023/0208051 | A1 | 6/2023 | Zhang et al. | |
| 2023/0291099 | A1 | 9/2023 | Pu et al. | |

FOREIGN PATENT DOCUMENTS

| | | | |
|---|---|---|---|
| WO | 2016115240 | A1 | 7/2016 |
| WO | 2019236203 | A2 | 12/2019 |
| WO | 2020072880 | A1 | 4/2020 |
| WO | 2020086303 | A1 | 4/2020 |
| WO | 2021141430 | A1 | 7/2021 |
| WO | 2022111408 | A1 | 6/2022 |

OTHER PUBLICATIONS

International Search Report and the Written Opinion of the International Searching Authority corresponding to International Patent Application No. PCT/CN2021/119584 (15 pages) (mailed Mar. 21, 2022).

* cited by examiner

BASE STATION ANTENNAS HAVING AN ACTIVE ANTENNA MODULE(S) AND RELATED MOUNTING SYSTEMS AND METHODS

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally shaped cell is divided into three 120° sectors in the azimuth plane, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements. The radios for these beamforming arrays may be integrated into the antenna so that the antenna may perform active beamforming (i.e., the shapes of the antenna beams generated by the antenna may be adaptively changed to improve the performance of the antenna). These beamforming arrays typically operate in higher frequency bands, such as various portions of the 3.3-5.8 GHz frequency band. Antennas having integrated radios that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

FIGS. 1 and 2 illustrate an example of a prior art "active" base station antenna 10 that includes a pair of beamforming arrays and associated beamforming radios. The base station antenna 10 is typically mounted with the longitudinal axis L of the antenna 10 extending along a vertical axis (e.g., the longitudinal axis L may be generally perpendicular to a plane defined by the horizon) when the antenna 10 is mounted for normal operation. The front surface of the antenna 10 is mounted opposite the tower or other mounting structure, pointing toward the coverage area for the antenna 10. The antenna 10 includes a radome 11 and a top end cap 20. The antenna 10 also includes a bottom end cap 30 which includes a plurality of connectors 40 mounted therein. As shown, the radome 11, top cap 20 and bottom cap 30 define an external housing 10*h* for the antenna 10. An antenna assembly is contained within the housing 10*h*.

FIG. 2 illustrates that the antenna 10 can include one or more radios 50 that are mounted to the housing 10*h*. As the radios 50 may generate significant amounts of heat, it may be appropriate to vent heat from the active antenna in order to prevent the radios 50 from overheating. Accordingly, each radio 50 can include a (die cast) heat sink 54 that is mounted on the rear surface of the radio 50. The heat sinks 54 are thermally conductive and include a plurality of fins 54*f*. Heat generated in the radios 50 passes to the heat sink 54 and spreads to the fins 54*f*. As shown in FIG. 2, the fins 54*f* are external to the antenna housing 10*h*. This allows the heat to pass from the fins 54*f* to the external environment. Further details of example conventional antennas can be found in co-pending WO2019/236203 and WO2020/072880, the contents of which are hereby incorporated by reference as if recited in full herein.

SUMMARY

Embodiments of the present invention are directed to a base station antenna assembly that includes: a housing having a passive antenna assembly and a passive reflector in the housing; a plurality of mounting structure brackets coupled directly or indirectly to a rear of the housing and to a mounting structure; a mounting frame coupled to the plurality of mounting structure brackets; an active antenna module positioned at least partially between opposing long sides of the mounting frame; and at least one active antenna bracket coupled to the mounting frame and to the active antenna module whereby the mounting frame attaches the active antenna module to the housing of the base station antenna.

The mounting frame can be electrically coupled to one or both of the active antenna module or the passive antenna assembly.

The mounting frame can be capacitively coupled to the active antenna module.

The active antenna module can include a massive multiple input multiple output (mMIMO) antenna array of radiating elements positioned in front of an active reflector. The passive reflector in the housing can be electrically coupled to the active reflector to thereby provide a common electrical ground.

The at least one of the plurality of mounting structure brackets can be galvanically coupled to the passive reflector.

The long sides can define or can be coupled to longitudinally extending planar metal strips that can be parallel to long sides of the active antenna module and sized and configured to electrically couple the active antenna module and the passive antenna assembly, optionally to inhibit back radiation from the passive antenna assembly.

The mounting frame can have a top portion with a laterally extending lip. The plurality of mounting structure brackets can include a first mounting structure bracket and a longitudinally spaced apart second mounting structure bracket. The first mounting structure bracket can have a laterally extending ledge that slidably cooperates with the lip.

The lip can have an upper surface and a lower surface with a forwardly facing laterally extending channel therebetween. The laterally extending ledge of the first mounting bracket can reside in the laterally extending channel of the lip.

The lip can have a plurality of spaced apart apertures that extend through the upper surface. The base station antenna can further include a plurality of fasteners, one that extends into each of the plurality of spaced apart apertures.

The plurality of spaced apart apertures can include first and second slots that extend laterally. Each of the first and second slots can include a first segment that merges into a narrower segment. When fully installed, a first fastener of the plurality of fasteners can extend into the narrower segment of the first slot and a second fastener of the plurality of fasteners can extend into the narrower segment of the second slot.

The plurality of mounting structure brackets can include a first mounting structure bracket and a longitudinally spaced apart second mounting structure bracket. The mounting frame can have a bottom portion with a plurality of laterally spaced apart fastener apertures.

The bottom portion of the mounting frame can have a first segment that defines one or more cable routing channels and a second segment that is orthogonal to and resides below the first segment and comprises the plurality of laterally spaced apart fastener apertures.

The second mounting structure bracket can have an upwardly extending projection that resides forward of the second segment of the bottom portion of the mounting frame and can include a plurality of fastener apertures that align with the fastener apertures of the bottom portion of the mounting frame. The base station antenna can include fasteners that extend through the fastener apertures of the bottom portion of the mounting frame and through the fastener apertures of the upwardly extending projection of the second mounting structure bracket to attach the bottom portion of the mounting frame to the second mounting structure bracket.

The at least one active antenna module bracket can have a laterally extending bracket segment that is attached to a rear of the active antenna module and that can merge into bracket arms that extend in a forward direction to couple to right and left sides of the long sides of the mounting frame.

The at least one active antenna module bracket can include a first bracket that has a top portion and a bottom portion. The top portion can be electrically coupled to a top portion of the active antenna module and/or a top portion of the mounting frame. The bottom portion can be attached to a rear of the active antenna module.

The mounting frame can be sized and configured to interchangeably serially couple to different configurations of active antenna modules using different configurations of the at least one active antenna module bracket to thereby provide a universal mounting system that can accommodate different active antenna modules.

Other embodiments are directed to a mounting system and/or mounting kit for field installation of an active antenna module to a base station antenna. The system/kit includes a mounting frame comprising a top portion, a bottom portion and a pair of laterally spaced apart and longitudinally extending side portions. The top portion and the bottom portion are configured to attach to mounting structure brackets that are supported by a mounting structure. The system/kit also includes a plurality of active antenna mounting brackets configured to attach the active antenna module to the mounting frame.

The mounting frame can have an open space between the top portion, the bottom portion and the side portions.

The side portions can define or can be coupled to longitudinally extending planar metal strips that are sized and configured to electrically couple the active antenna module and the passive antenna assembly.

The top portion can include a laterally extending lip.

The lip can have an upper surface and a lower surface with a forwardly facing laterally extending channel therebetween. The laterally extending channel can be configured to slidably receive a laterally extending ledge provided by one of the mounting structure brackets or bracket attached thereto.

The lip or a wall segment of the mounting frame adjacent thereto can have a plurality of spaced apart apertures. The mounting system and/or kit can further include a plurality of fasteners, including one that extends into each of the plurality of spaced apart apertures.

The plurality of spaced apart apertures can include first and second slots that extend laterally, each with a first segment that merges into a narrower segment. When fully installed, a first fastener of the plurality of fasteners can extend into the narrower segment of the first slot and a second fastener of the plurality of fasteners can extend into the narrower segment of the second slot.

The bottom portion of the mounting frame can have a first segment that defines one or more cable routing channels and a second segment that is orthogonal to and resides below the first segment and comprises a plurality of laterally spaced apart fastener apertures.

The at least one of the plurality of active antenna module brackets can include a laterally extending bracket segment that is attachable to a rear of the active antenna module and that merges into bracket arms that extend in a forward direction to couple to right and left sides of the long sides of the mounting frame.

The plurality of active antenna module brackets can include a first bracket that comprises a top portion and a bottom portion. The top portion can be configured to electrically couple to a top portion of the active antenna module and/or a top portion of the mounting frame. The bottom portion can be configured to attach to a rear of the active antenna module.

Still other embodiments are directed to methods of installing an active antenna module to a base station antenna. The methods include: providing a mounting system that includes a mounting frame and a plurality of active antenna mounting brackets; attaching the active antenna module to the mounting frame using the plurality of active antenna mounting brackets; lifting the mounting frame with the attached active antenna module to a position that is aligned with first and second mounting structure brackets about a rear surface of the base station antenna; then sliding the mounting frame laterally inward about a ledge provided by the first mounting structure bracket; and then attaching a plurality of fasteners to couple the mounting frame to the first and second mounting structure brackets to thereby install the active antenna module to the base station antenna.

The lifting, sliding and attaching can be carried out while the base station antenna is operating and erect.

The active antenna module can provide 5G operation and the passive antenna of the base station antenna can provide 4G operation.

The mounting frame and the first and second mounting structure brackets can cooperate to position the active antenna module with a front radome thereof intact so that at least a major portion of a mMIMO antenna array in the active antenna module faces a front radome of the base station antenna and resides between right and left side columns of low band radiating elements in the base station antenna.

Still other embodiments are directed to a base station antenna assembly that includes: a housing with a passive antenna assembly and a passive reflector in the housing; a plurality of mounting structure brackets coupled directly or indirectly to a rear of the housing and to a mounting structure; a mounting frame coupled to the plurality of mounting structure brackets; a housing of an antenna device positioned at least partially between opposing long sides of the mounting frame; and at least one antenna device bracket coupled to the mounting frame and to the antenna device whereby the mounting frame attaches the antenna device to the housing of the base station antenna.

The antenna device can be a radio, a filter, a calibration unit, an S-band antenna or combinations thereof and/or an active antenna module.

Embodiments of the present invention provide base station antennas with respective passive antenna assemblies within a housing and that are configured to releasably couple to an external device such as, for example, an active antenna module that is at least partially external to the housing of the base station antenna/passive antenna housing.

DETAILED DESCRIPTION

In the description that follows, a base station antenna 100 will be described using terms that assume that the base station antenna 100 is mounted for use on a tower, pole or other mounting structure with the longitudinal axis L of the antenna 100 (FIGS. 14A-14C) extending along a vertical axis and the front of the base station antenna 100 mounted opposite the tower, pole or other mounting structure pointing toward the target coverage area for the base station antenna 100 and the rear of the base station antenna 100 facing the tower or other mounting structure. It will be appreciated that the base station antenna 100 may not always be mounted so that the longitudinal axis L thereof extends along a vertical axis. For example, the base station antenna 100 may be tilted slightly (e.g., less than 10°) with respect to the vertical axis so that the resultant antenna beams formed by the base station antenna 100 each have a small mechanical downtilt.

Referring to FIGS. 3A-7B, an example mounting frame 60 configured to provide a mounting system for mounting a device behind the base station antenna 100. The device can comprise filters (110*f*, FIG. 7C) and/or antenna systems, such as S-band antennas, and/or an active antenna module 110. In some embodiments, the mounting frame 60 is configured to attach the device such as the active antenna module 110 to a base station antenna 100 (FIGS. 14A-14C) without requiring rails provided directly on the base station antenna to mount the frame 60 and/or by modifying the bracket structure providing the mounting interface for the (pole/tower) support structure mounting bracket for mounting the frame 60. The term "active antenna module" is used interchangeably with "active antenna unit" and "AAU" and refers to a cellular communications unit comprising radio circuitry and associated antenna elements that are capable of electronically adjusting the amplitude and/or phase of the subcomponents of an RF signal that are output to different radiating elements of an array or groups thereof. The active antenna module 110 comprises the radio circuitry and the radiating elements (e.g., a multi-input-multi-output (mMIMO) beamforming antenna array) and may include other components such as filters, a, calibration network, antenna interface signal group (AISG) controller and the like. The active antenna module 110 can be provided as a single integrated unit or provided as a plurality of stackable units, including, for example, first and second sub-units such as a radio sub-unit (box) with the radio circuitry and an antenna sub-unit (box) with a multi-column array of radiating elements and the first and second sub-units stackably attach together in a front to back direction of the base station antenna 100, with the antenna unit closer to the front 100*f* (external radome) of the base station antenna 100 than the radio unit.

Figure 23:
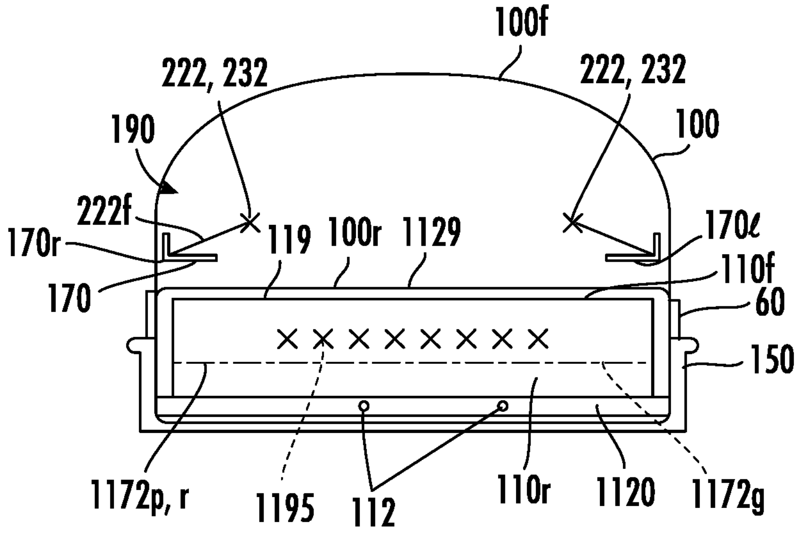
FIG. 23 is a lateral section, simplified schematic illustration of an example base station antenna coupled to an active antenna module according to embodiments of the present invention.
Figure 24:
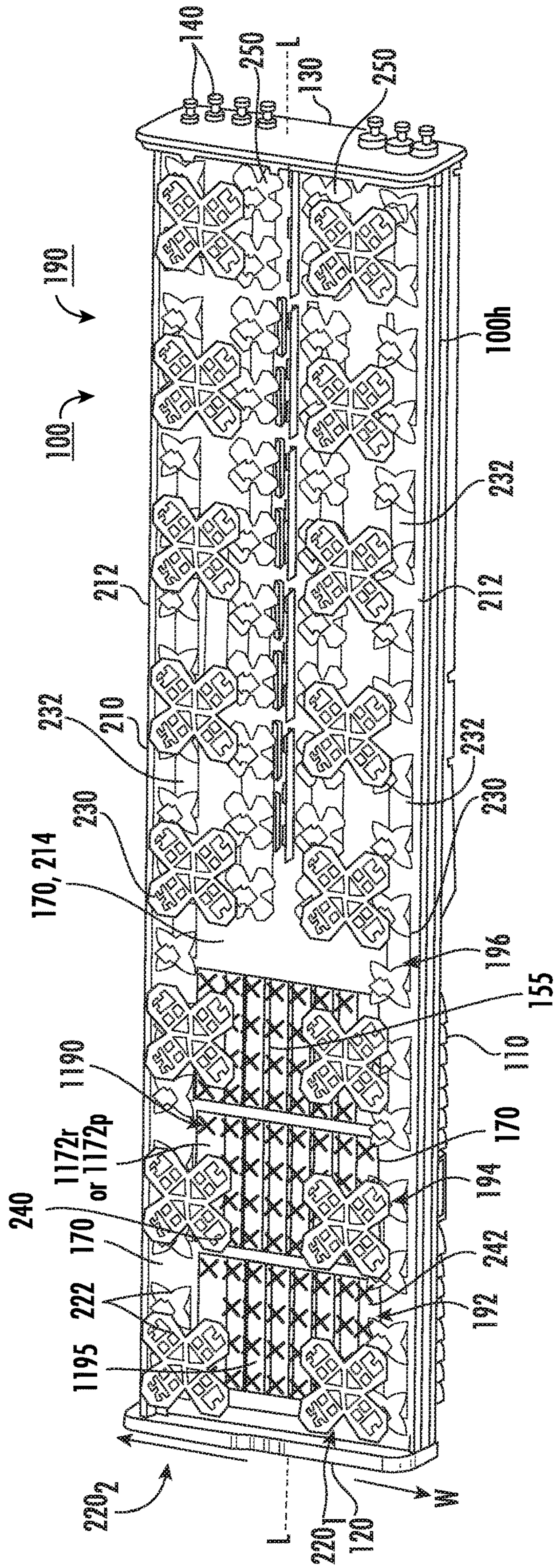
FIG. 24 is a front, side perspective view of a portion of a base station antenna, without the radome(s) illustrating example radiating element arrangements according to embodiments of the present invention.

As will be discussed further below, the base station antenna 100 with the antenna housing 100*h* includes a passive antenna assembly 190 (FIG. 24). The term "passive antenna assembly" refers to an antenna assembly having arrays of radiating elements that are coupled to radios that are external to the antenna, typically remote radio heads that are mounted in close proximity to the base station antenna 100/housing 100*h*. The arrays of radiating elements included in the passive antenna assembly are configured to form static antenna beams. The passive antenna assembly can comprise radiating elements such as one or both low band radiating elements 222 and/or mid-band or high band radiating elements 232 (FIGS. 23, 24). The passive antenna assembly 190 is mounted in the base station antenna housing 100*h* and the base station antenna housing 100*h* can releasably (detachably) couple (e.g., directly or indirectly attach) to one or more active antenna modules 110 that is/are separate from the passive antenna assembly 190.

Turning again to FIGS. 3A-7B, the mounting frame 60 comprises a top portion 60*t*, a bottom portion 60*b* and laterally spaced apart side portions 61 that extend between the top and bottom portions in a longitudinal direction. The mounting frame 60*c* can comprise an open region 62 extending between the top portion 60*t* and the bottom portion 60*b* and the laterally spaced apart side portions 61. The size of the open region 62 can vary and is not required to extend an entire length or width between the opposing sides 61.

Figure 1:
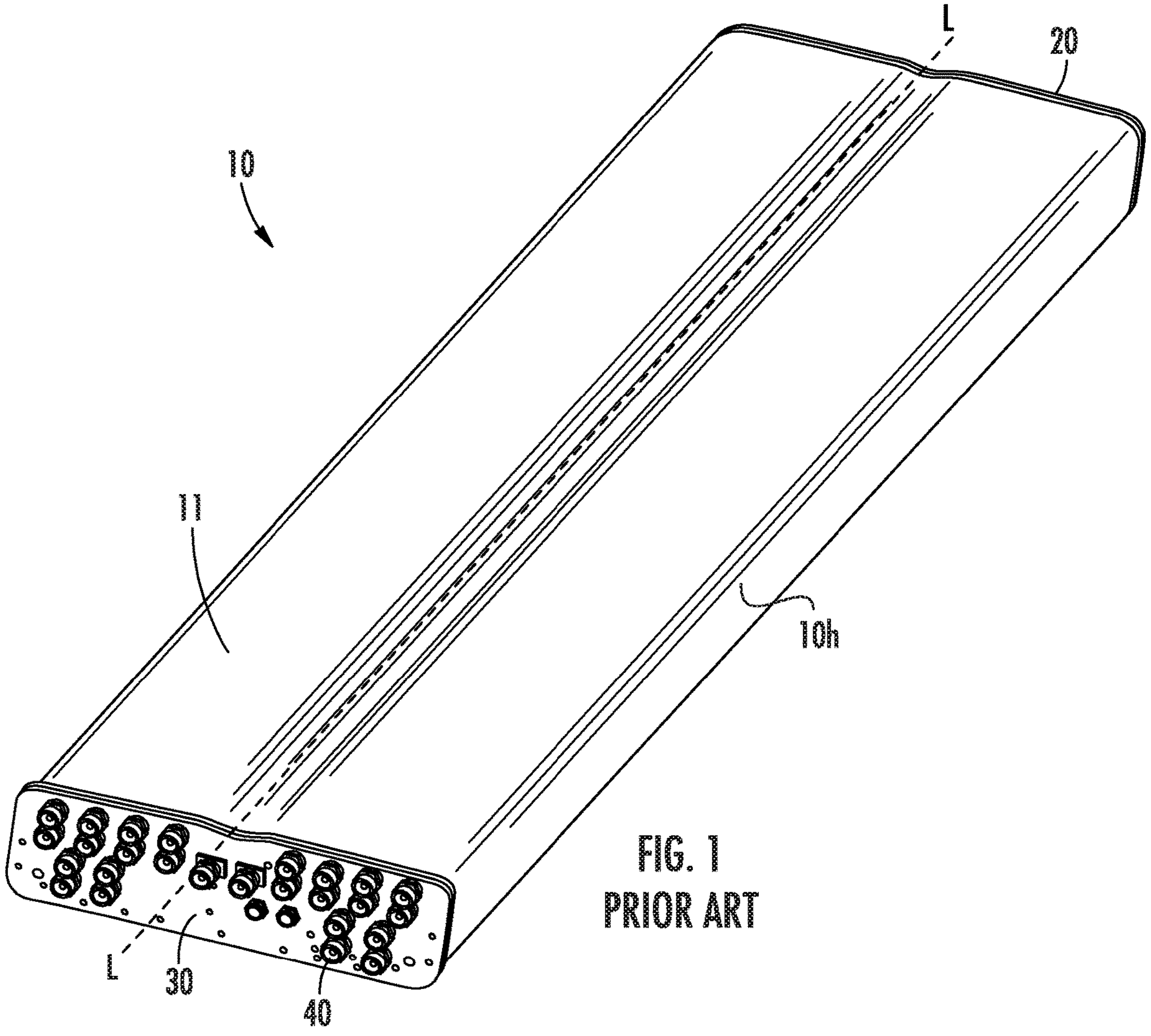
FIG. 1 PRIOR ART
FIG. 1 is a perspective view of a prior art base station antenna.
Figure 2:
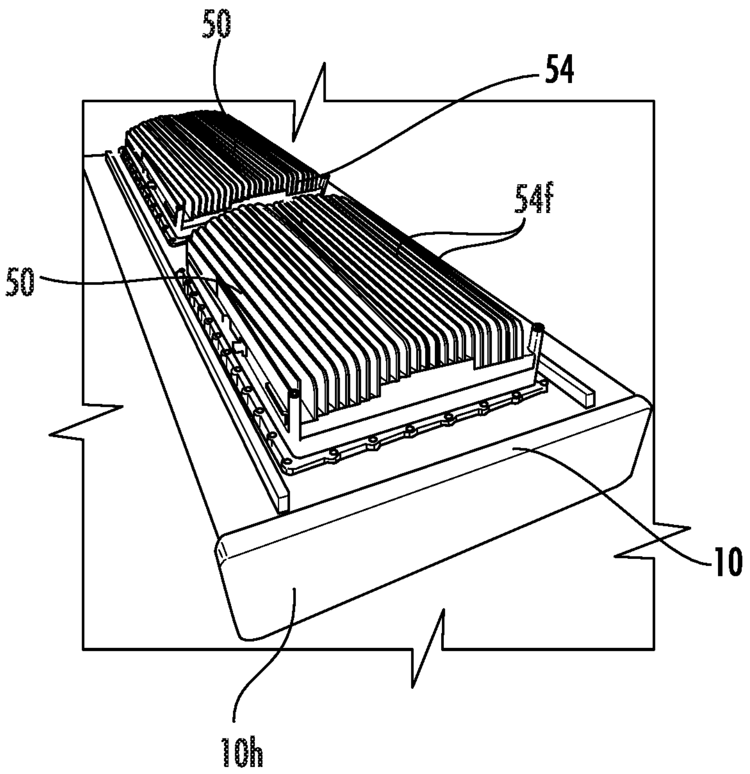
FIG. 2 PRIOR ART
FIG. 2 is a back view of the prior art base station antenna of FIG. 1.
Figure 3A:
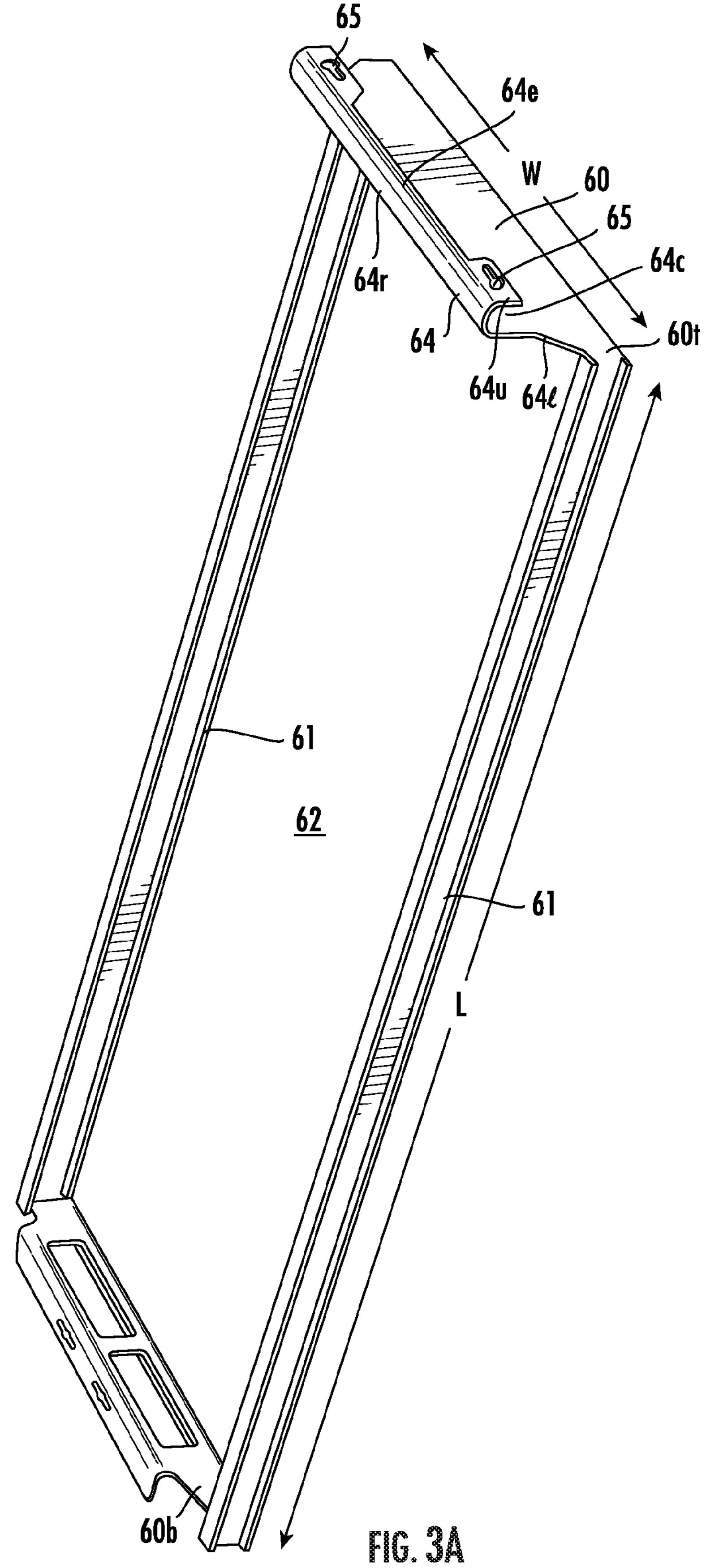
FIG. 3A is a side perspective view of a mounting frame for mounting an active antenna module to a base station antenna according to embodiments of the present invention.
Figure 3B:
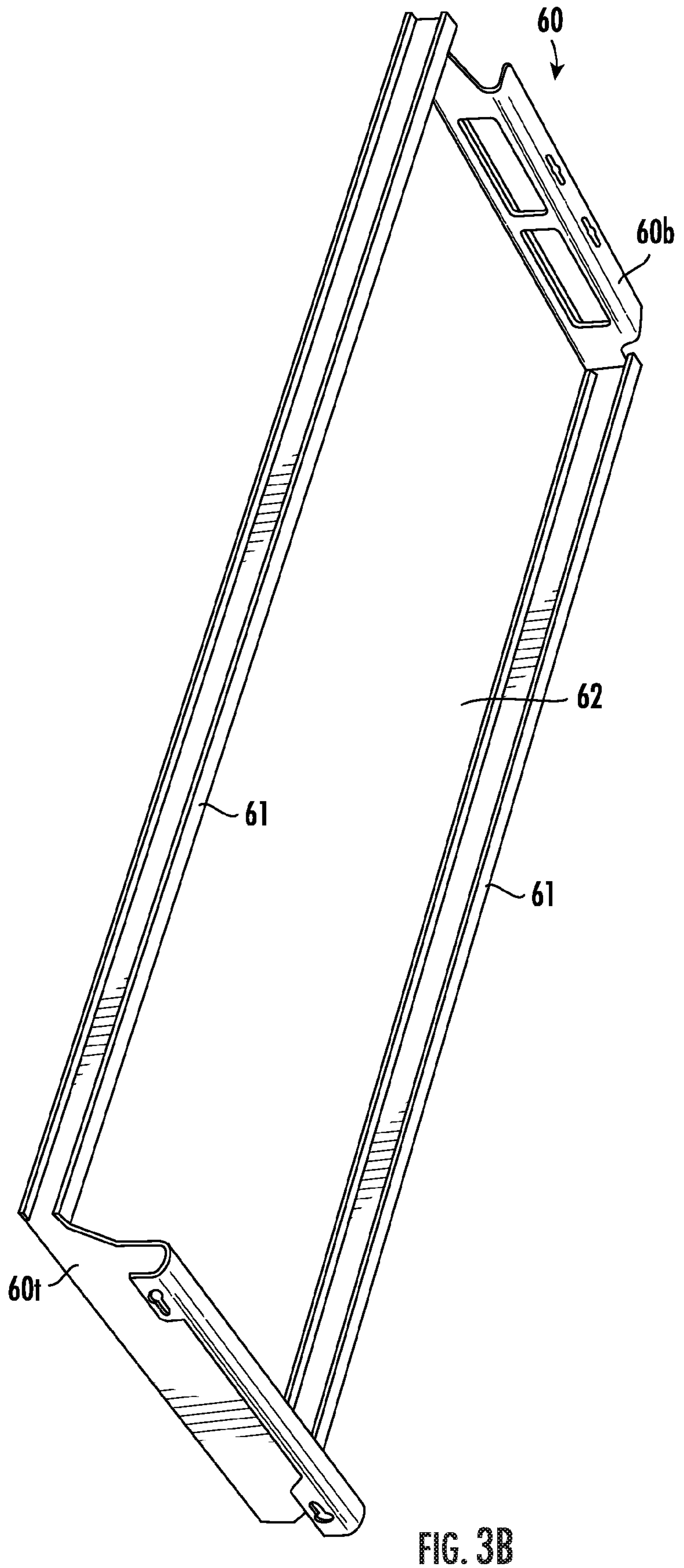
FIG. 3B is another side perspective view of the mounting frame shown in FIG. 3A.
Figure 5A:
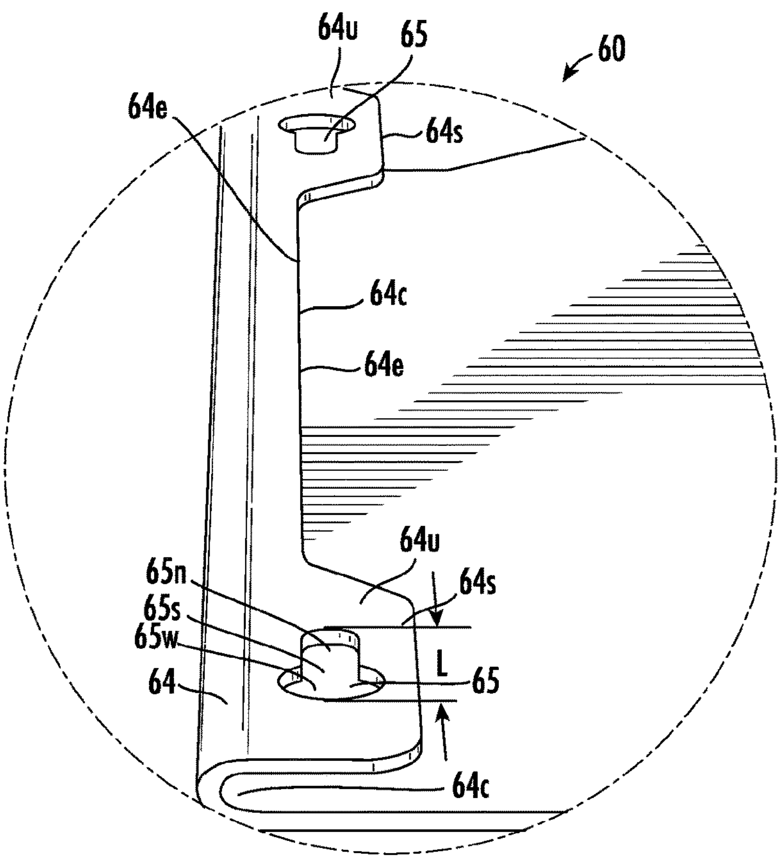
FIG. 5A is a greatly enlarged perspective view of a top portion of the mounting frame shown in FIG. 3A.

Referring to FIGS. 3A, 3B, and 5A, the top portion 60*t* can have a lip 64 with an upper portion 64*u* and a lower portion 647. The upper portion 64*u* can comprise a plurality of laterally spaced apart apertures 65, which may be provided as slots 65*s* with a first region 65*w*, which may be a circular region, merging into a narrower second region 65*n* along its length (with its length oriented to extend in a width dimension of the AAU 110 and base station antenna 100). The apertures 65 receive fasteners 165 (FIGS. 18A-18C) that can extend downward. However, other attachment configurations and members may be used. The lip 64 can have a rearward facing segment 64*r* that joins the lower portion 64*l* and the upper portion 64*u* and resides behind an open and laterally extending channel 64*c* that resides between the upper portion 64*u* and the lower portion 64*l* of the lip 64. The upper portion 64*u* and the lower portion 64*l* can be in parallel planes and the parallel planes can be orthogonal to the longitudinal direction/dimension L of the mounting frame 60 and the base station antenna 100. The upper portion 64*u* can have a free end 64*e* facing in a forward direction. The apertures 65 can be provided in shoulder segments 64*s* that project forwardly relative to adjacent (neighbor) segments of the upper portion 64*u* of the lip 64.

Figure 6:
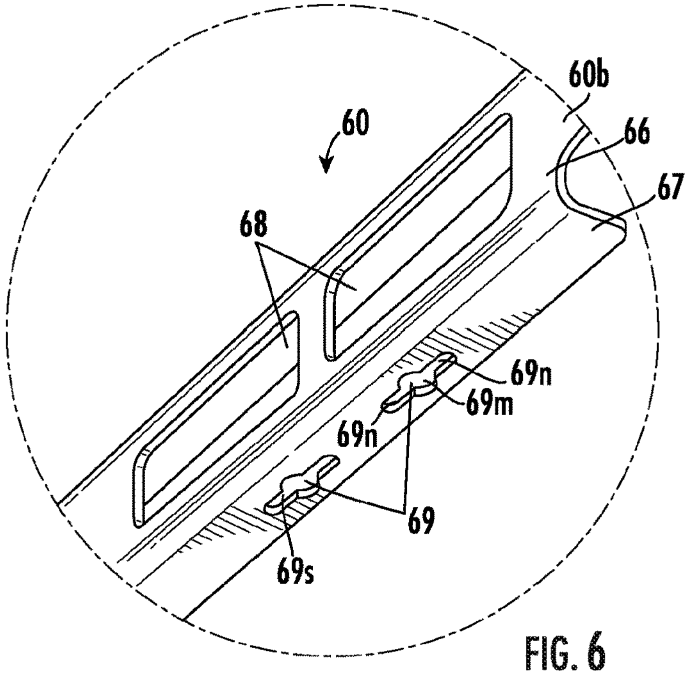
FIG. 6 is a greatly enlarged perspective view of a bottom portion of the mounting frame shown in FIG. 3B.

Referring to FIGS. 3A, 3B and 6, the bottom portion 60*b* of the mounting frame 60 can have a first laterally extending segment 66 that provides one or more cable routing channels 68 and a second laterally extending segment 67 that provides fastener apertures 69. The first segment 66 can be orthogonal to the second segment 67. The second segment 67 can be parallel to a rear surface of the base station antenna 100. The fastener apertures 69 can be provided as laterally extending slots 69*s*. The slots 69 can have a medial segment 69*m* that resides between right and left side segments that are narrower segments 69*n* in the embodiment shown. The medial segment 69*m* can have an open center between arcuate outer perimeter wall segments.

Figure 4:
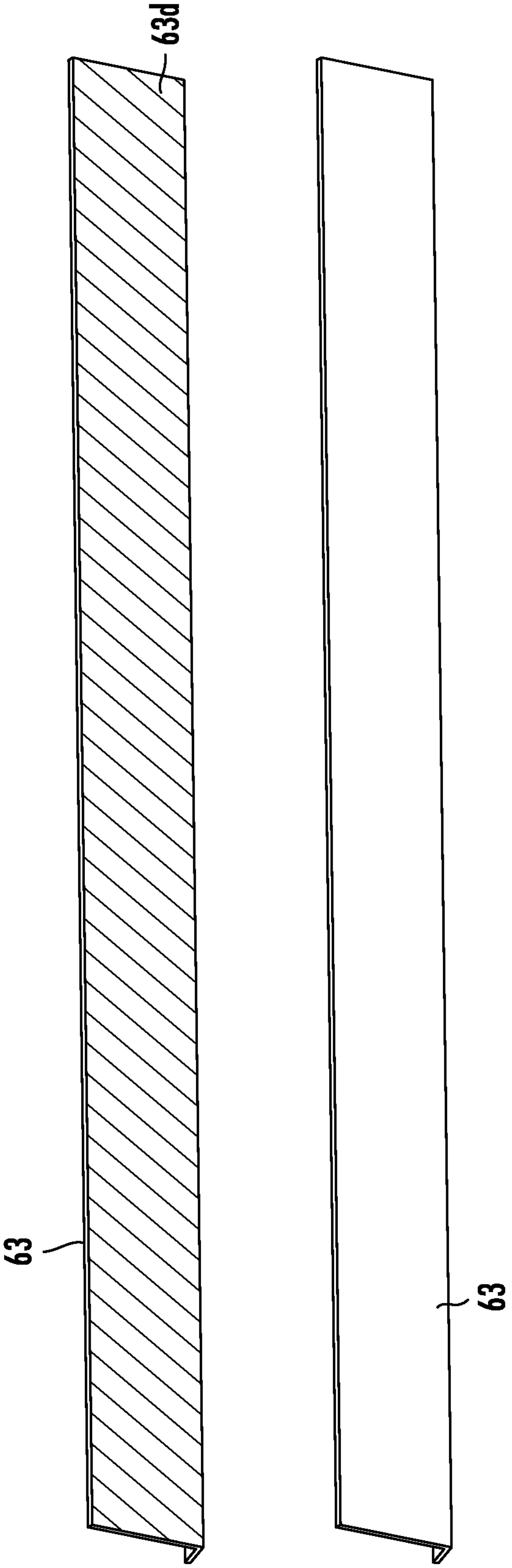
FIG. 4 is a side perspective view of electrical coupling members according to embodiments of the present invention.

FIG. 4 illustrates a pair of electrical coupling members 63 that can optionally be attached to the sides 61 of the mounting frame 60. The electrical coupling members 63 can have a length that is the same, greater than or less than the length of the sides 61 of the mounting frame 60.

The electrical coupling members 63 can be configured to galvanically or capacitively couple to the AAU 110 and/or a reflector 170 (FIGS. 23, 24) in the base station antenna housing 100*h*. The reflector 170 in the base station antenna housing 100*h* can be called "the passive reflector". The housing 110*h* of the AAU 110 can comprise a conductive metal that can couple to the mounting frame 60. The electrical path provided by the electrical coupling members 63 can reduce PIM and/or reduce back radiation of antenna elements and/or improve front to back ratio and/or improve sector power ratio and/or provide an electrical connection between the reflector 170 of the base station antenna/passive antenna assembly and components of the active antenna module 110. The coupling members 63 can be provided as metallic planar strips, optionally with a thin profile having an "L or I" shape when viewed from the end, that define (e.g., be integrally, monolithically formed into/by the frame 60) the long sides 61 of the mounting frame 60 and/or that are attached thereto and that can be parallel to long sides of the active antenna module 110.

The coupling members 63 can optionally electrically the active antenna module 110 and the passive antenna assembly 190 of the base station antenna 100 and/or isolate excessive metal-to-metal surfaces from direct galvanic contact to avoid PIM. Embodiments of the invention may configure the electrical coupling members 63 and/or the mounting frame 60 to couple (electromagnetically/capacitively or galvanically) and/or inhibit back radiation. The mounting frame 60 and the active antenna module 110 and/or the mounting frame 60 and the passive antenna assembly 190 can be configured to be electromagnetically/capactively or galvanically coupled together thereby aiming to reduce non-coupled regions between the passive and active antennas.

The coupling members 63 and/or sides of the mounting frame 60 may, in some particular embodiments, optionally couple to the active antenna module 110 to define RF isolation fences and/or provide RF isolation between the active antenna module 110 and the passive antenna assembly 190. The RF isolation isolation fences can be configured to inhibit or prevent backwardly directed radiation through a medially and longitudinally extending space or hole (if present according to some embodiments) in the passive reflector 170.

The electrical coupling members 63 and the mounting frame 60 together with other surfaces can provide an electrical current path providing a set of surfaces that create a ground path, e.g., direct current (DC) electrical current path, between an internal back plane 1172*p* or reflector 1172*r* (FIG. 23) in the active antenna module 110 and the reflector 170 of the passive antenna assembly 190 (FIGS. 23/24) in the base station antenna housing 100*h* to provide a common electrical ground. The reflector 1172*r* in the AAU 110 can be smaller than the reflector 170 in the base station antenna 100*h*. The reflector 1172*r* in the AAU 110 can be provided as a metal ground plane of a printed circuit board. The reflector 1172*r* can be called the "active reflector" for ease of description.

One or more of the brackets 150$_1$, 150$_2$, 150$_1$', 150$_2$' (each of these brackets can generally be referred to as bracket 150 without the suffix) using fasteners 111 or 112 can provide an electrical ground path (DC current) between an internal back plane or reflector 1172 (FIG. 23) in the active antenna module 110 and a reflector 170 of the passive antenna assembly 190 (FIGS. 23/24) in the base station antenna housing 100*h* to provide a common electrical ground.

Where used, the electrical coupling members 63 can be provided adjacent to and inside the sides 61 of the antenna frame 60 or adjacent to and outside the sides 61 of the antenna frame 60. The electrical coupling members 63 can abut the sides 61. The electrical coupling members 63 can be provided in pairs that sandwich each side 61 of the mounting frame 60.

The electrical coupling members 63 can cooperate with or include a dielectric material 63*d*. The dielectric material 63*d* can comprise a mylar material such as a mylar gasket and/or a dielectric coating. The sides 61 of the mounting frame 60 can be configured with the electrical coupling members 63 formed to be integral, monolithically formed with a unitary body of the mounting frame 60. That is, in some optional embodiments, the mounting frame 60 can be formed by bending, stamping, die-casting or otherwise shaping a sheet of metal or other substrate into the desired shape to provide the top, bottom and sides thereof and optionally the coupling members 63.

Turning now to FIGS. 7A, 7B, and 8-10, the mounting frame 60 can be coupled to an active antenna module 110 using a first bracket 150$_1$ and a second bracket 150$_2$. The first bracket 150$_1$ can have top end portion 150*t* and a bottom end portion 150*b*. The bottom end portion 150*b* couples to a rear 110*r* of the active antenna module 110 using a plurality of fasteners 112. The top end portion 150*t* can face in a forward direction and extend forward of the second bracket 150$_2$.

Figure 7A:
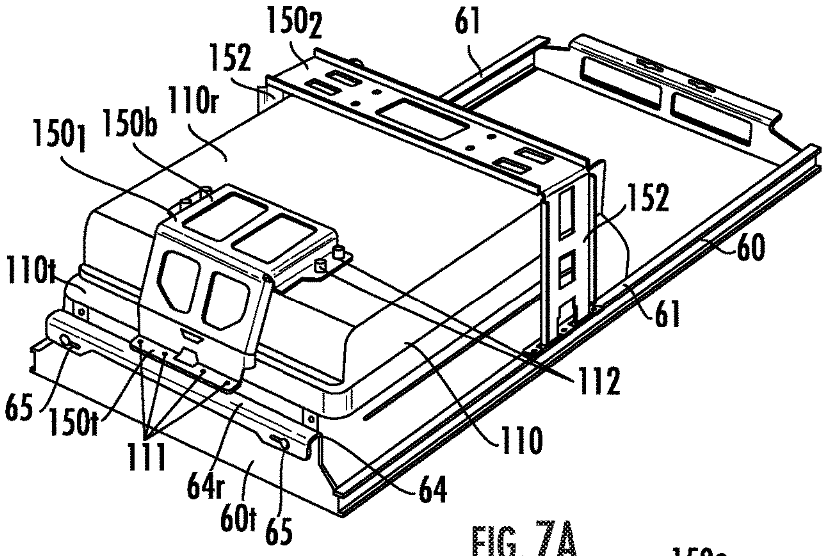
FIGS. 7A and 7B are side perspective views of the mounting frame shown in FIG. 3A coupled to an example active antenna module according to embodiments of the present invention.
Figure 7B:
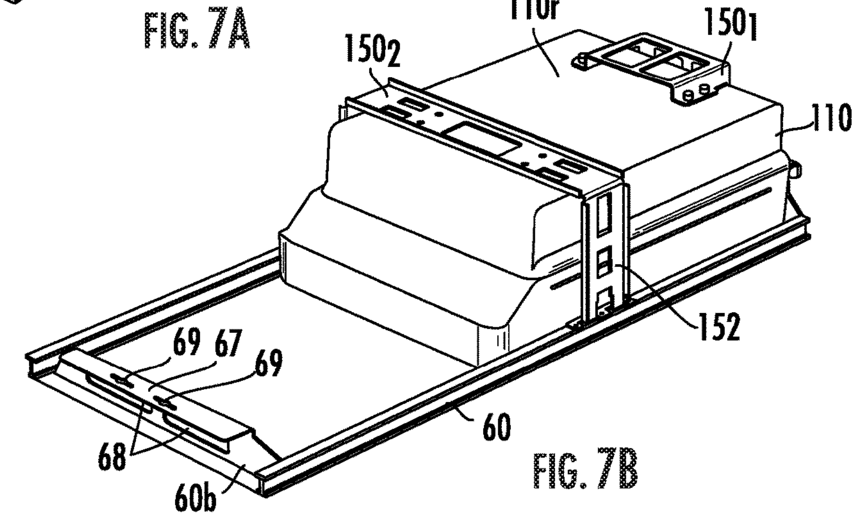
Figure 7C:
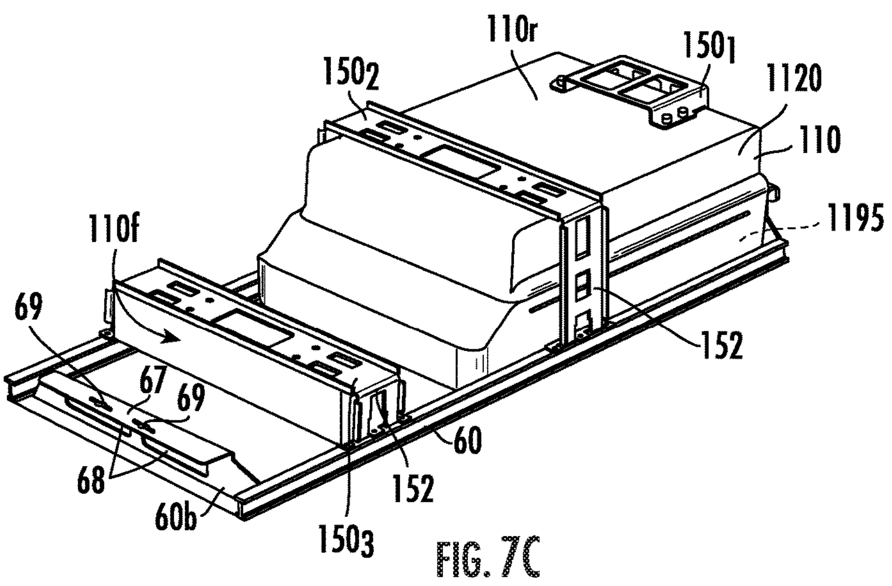
FIG. 7C is a side perspective view of the mounting frame shown in FIG. 3A also coupled to a filter unit according to embodiments of the present invention.
Figure 8:
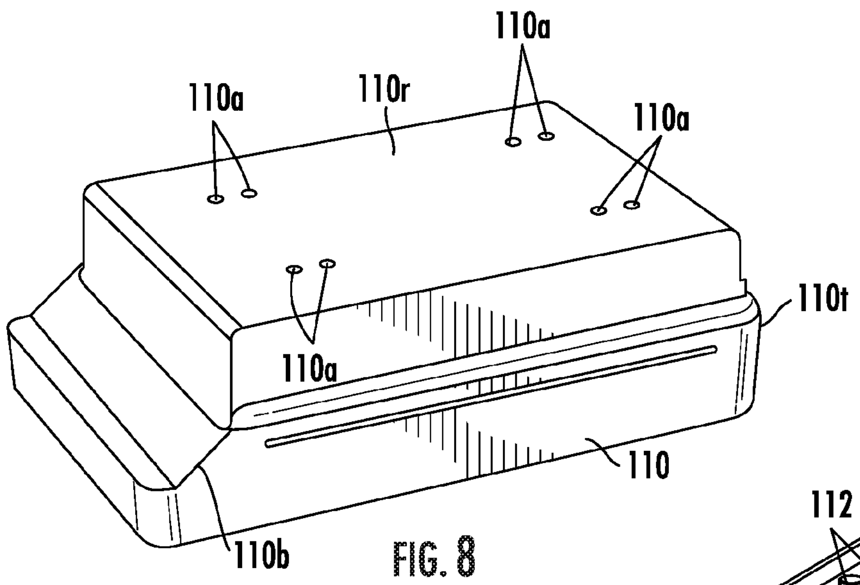
FIG. 8 is side perspective view of the example active antenna module shown in FIGS. 7A, 7B.
Figure 9:
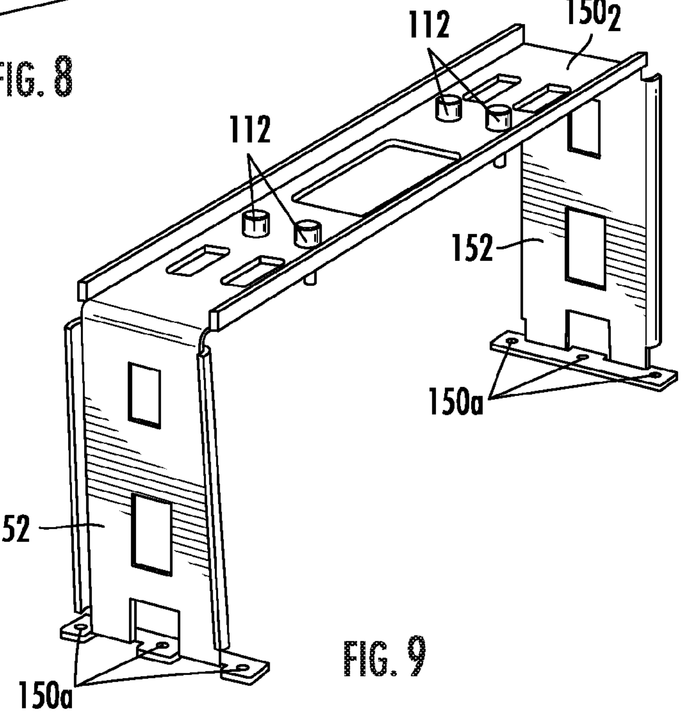
FIGS. 9 and 10 are back, side perspective views of the active antenna module brackets shown in FIGS. 7A, 7B.
Figure 10:
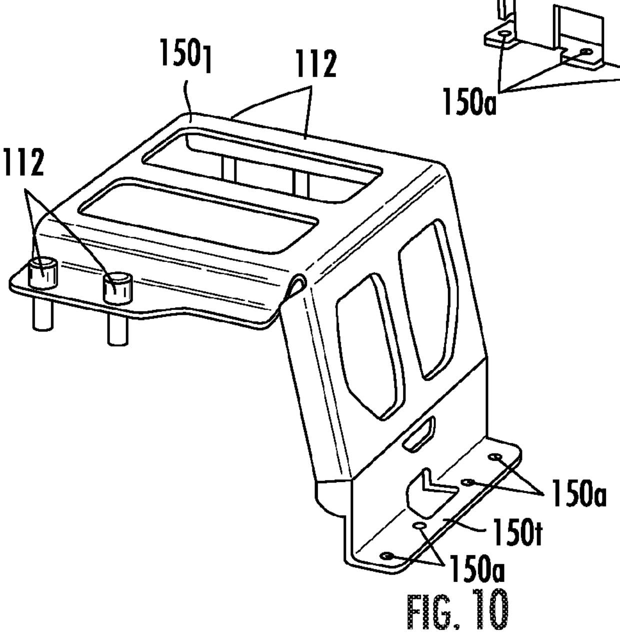
Figure 11A:
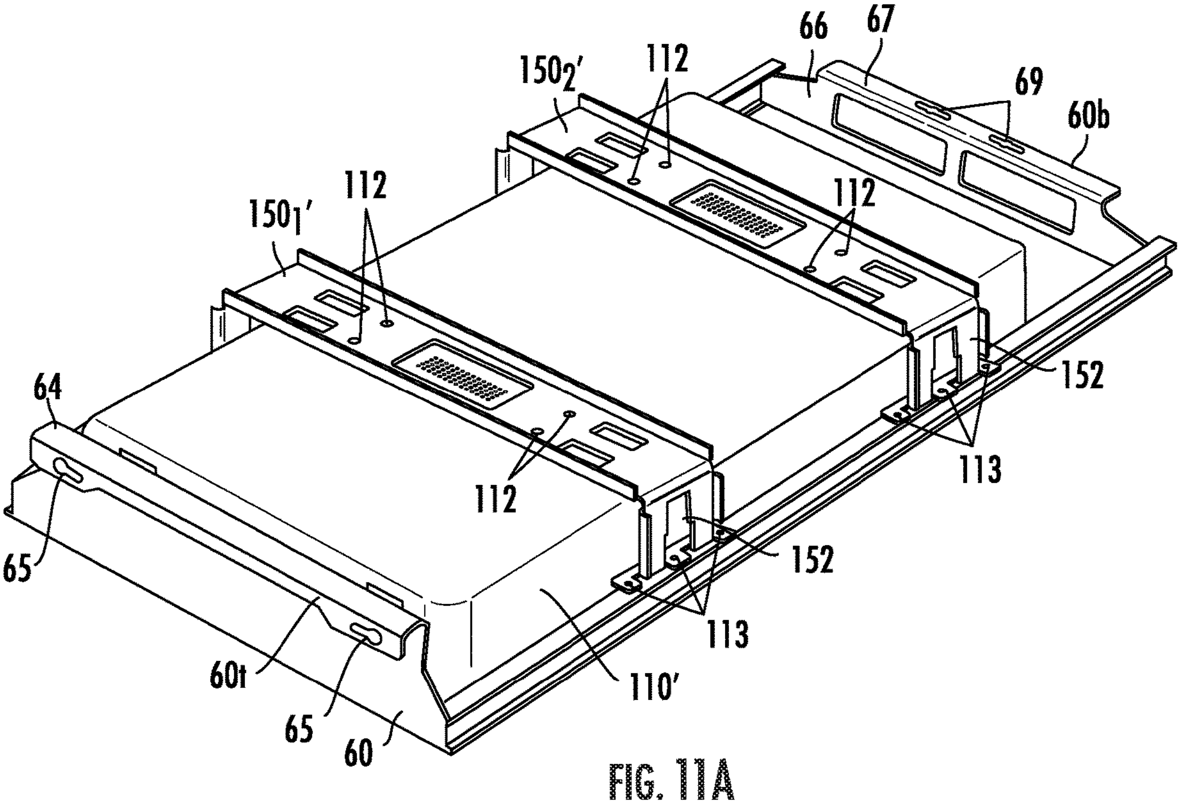
FIGS. 11A and 11B are side perspective views of the mounting frame shown in FIG. 3A coupled to another example active antenna module according to embodiments of the present invention.
Figure 11B:
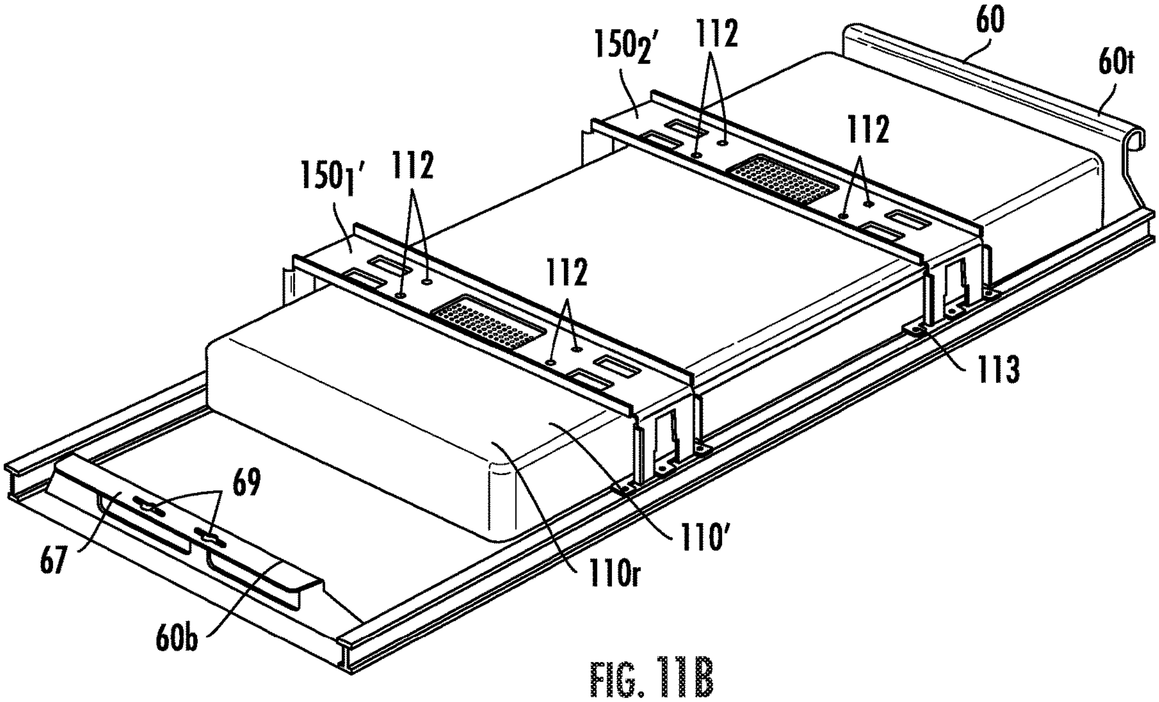
Figure 12:
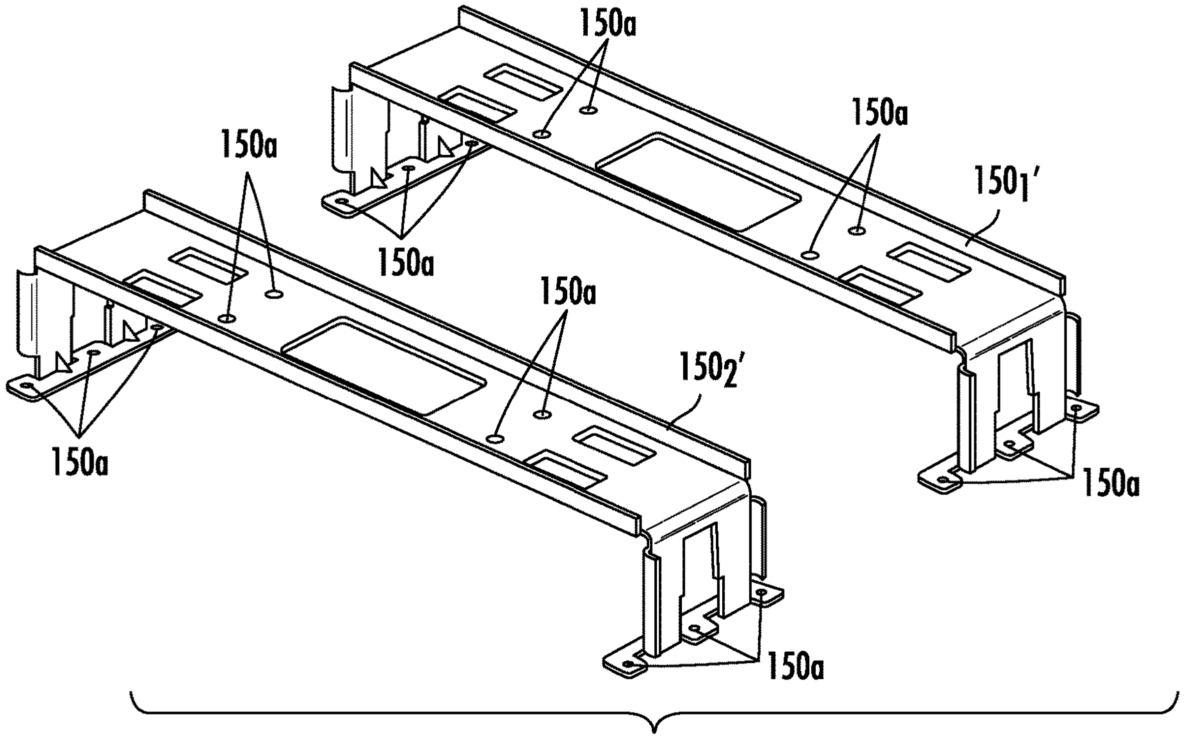
FIG. 12 is a back, side perspective view of the active antenna module brackets shown in FIGS. 11A, 11B.
Figure 13:
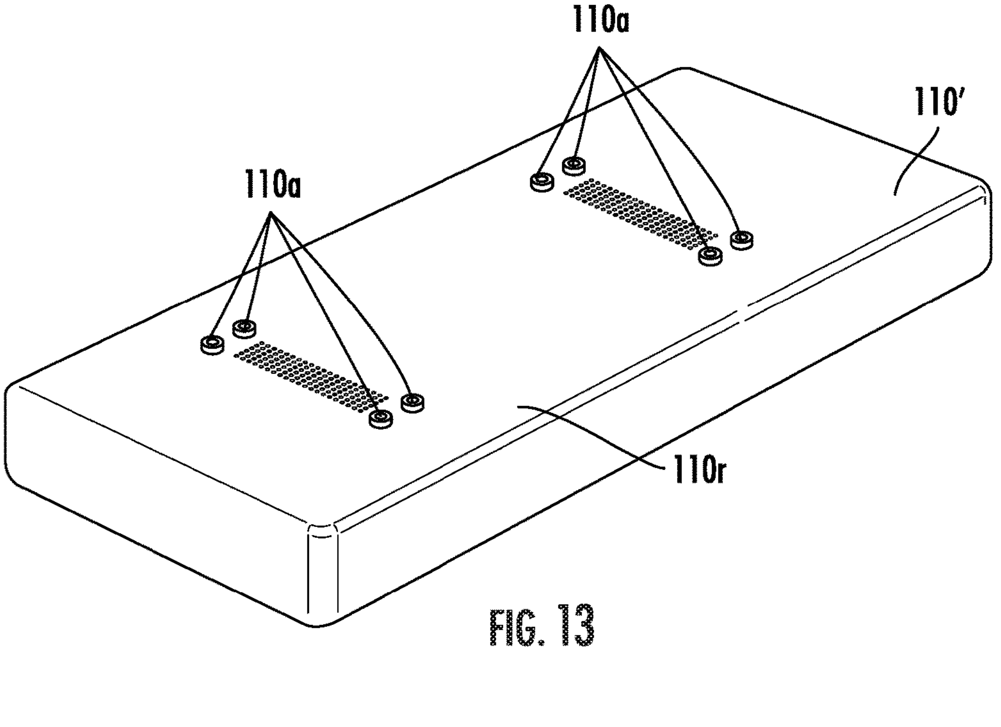
FIG. 13 is side perspective view of the example active antenna module shown in FIGS. 11A, 11B.

FIG. 7C illustrates that the mounting frame 60 can alternatively or additionally support a filter 110*f* using a third bracket 1503. The bracket 1503 can comprise bracket arms 152 that couple to the sides 61 of the mounting frame 60 and a rear that couples to the filter 110*f*. The mounting frame 60 can be used to only support the filter 110*f* and is not required to also concurrently support the active antenna module 110, or other device such as a radio. In the embodiment shown in FIG. 7C, filters inputs can come from the radio 1120 (which has RF connector ports) and the filter outputs can go to the antenna 1195. For example, there can be a plurality of RF connector ports/connectors and a calibration port/calibration connector then the antenna can typically have the same number of ports (likewise, filter would as well for inputs and outputs). In this embodiment, the outer rearward box can provide the radio 1120 and the inner (front facing) box can provide the active antenna 1195 facing into the rear 100*r* of the base station antenna housing 100*h*. The boxes may be stacked, in a front to back direction, and cabled to connect to each other as is known to those of skill in the art. The filter 110*f* can be configured as a rectangular box as shown. The filter 110*f* can sit inline for cabling between the radio 1120 and antenna 1195 and/or below the radio 1120 and antenna 1195. For example discussions of filters and radio connections, see, e.g., co-pending U.S. patent application Ser. No. 17/203,090, filed Mar. 16, 2021 and Italian Patent Application Serial Number 102021000014843, filed Jun. 8, 2021, the contents of which are hereby incorporated by reference as if recited in full herein.

The top end portion 150*t* of the first bracket 150$_1$ can have fastener apertures 150*a*. The top end portion 150*t* can, but is not required to, couple to the lip 64 of the mounting frame 60 via fasteners 111. The top end portion 150*t* of the first bracket 150$_1$ can also or alternatively couple to the top end portion 110*t* of the active antenna module 110. If attached, the lip 64 can reside between the active antenna module 110 and the top end portion 150*t* of the first bracket 150*t*. If the top end portion 150*t* is not attached to either the active antenna module 110 or the lip 64, the lip 64 can reside above, but adjacent to, the top 110*t* of the active antenna module 110. The rear 110*r* of the active antenna module 110 can comprise apertures 110*a* that receive fasteners 111 or 112.

The second bracket 150$_2$ can extend across a width of the active antenna module 110 and comprise side arms 152 that extend in a forward direction and couple to rear 110*r* of the active antenna module 110 via fasteners 112 and the corresponding side 61 of the mounting frame 60 via fasteners 113.

Turning now to FIGS. 11A, 11B, 12 and 13, the mounting frame 60 is shown attached to a different configuration of an active antenna module 110' using first and second brackets, 150$_1$', 150$_2$'. Again, the first and second brackets 150$_1$', 150$_2$' can be configured to attach to a rear 110*r* of the active antenna module 110' using fasteners 112.

Thus, the mounting frame 60 can be configured to be a "universal" mounting frame 60 that can accommodate a plurality of different configurations of active antenna modules without requiring rails to be provided directly on the base station antenna housing 100*h* which can reduce costs, and potentially weight and numbers of mounting components and also reduces the number of fasteners that may otherwise needed to be loosened to adjust mechanical tilt. In some embodiments, the mounting frame 60 can have a unique configuration or portion thereof, configured to accommodate a defined active antenna module 110 of a corresponding manufacturer or radio.

In some embodiments, one or more of the brackets $\mathbf{150}_1$, $\mathbf{150}_2$, $\mathbf{150}_1$', $\mathbf{150}_2$', can be galvanically attached to the active antenna module 110, 110' and the antenna frame 60. In some embodiments, one or more of the mounting structure bracket(s) 160, 162 providing the tower/building/pole to base station antenna support (FIGS. 14A-14C, for example) can be galvanically attached to internal components of the base station antenna. Thus, one or more of the galvanic connections can define a direct current (DC) path to/between internal components in the active antenna module 110, 110' and the mounting frame 60 and internal components (e.g., reflector 170) of the base station antenna 100.

Figure 14A:
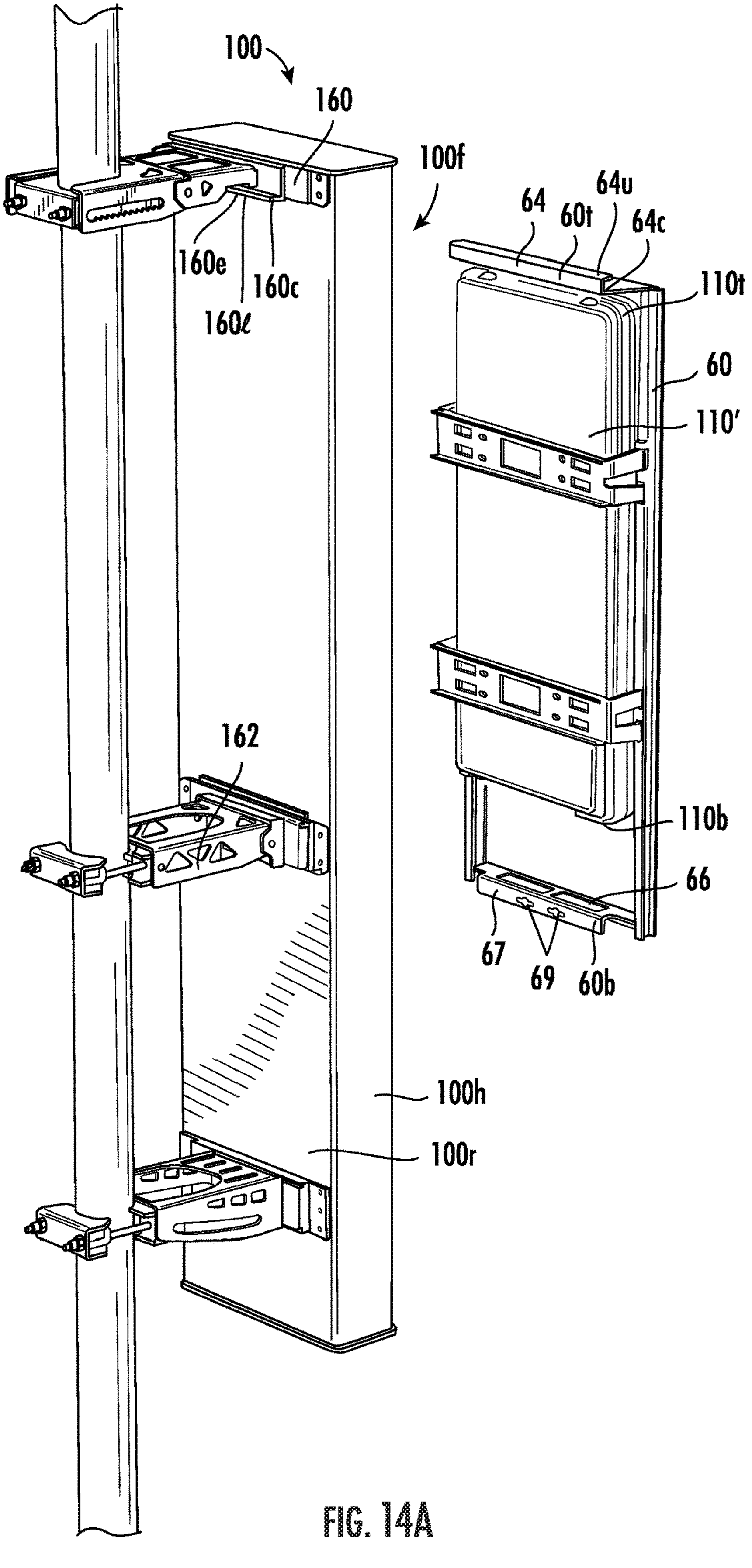
FIGS. 14A-14C are rear perspective views of a series of mounting actions that can be used to mount the active antenna module behind a base station antenna comprising a passive antenna assembly using the mounting frame shown in FIG. 3A according to embodiments of the present invention.
Figure 14B:
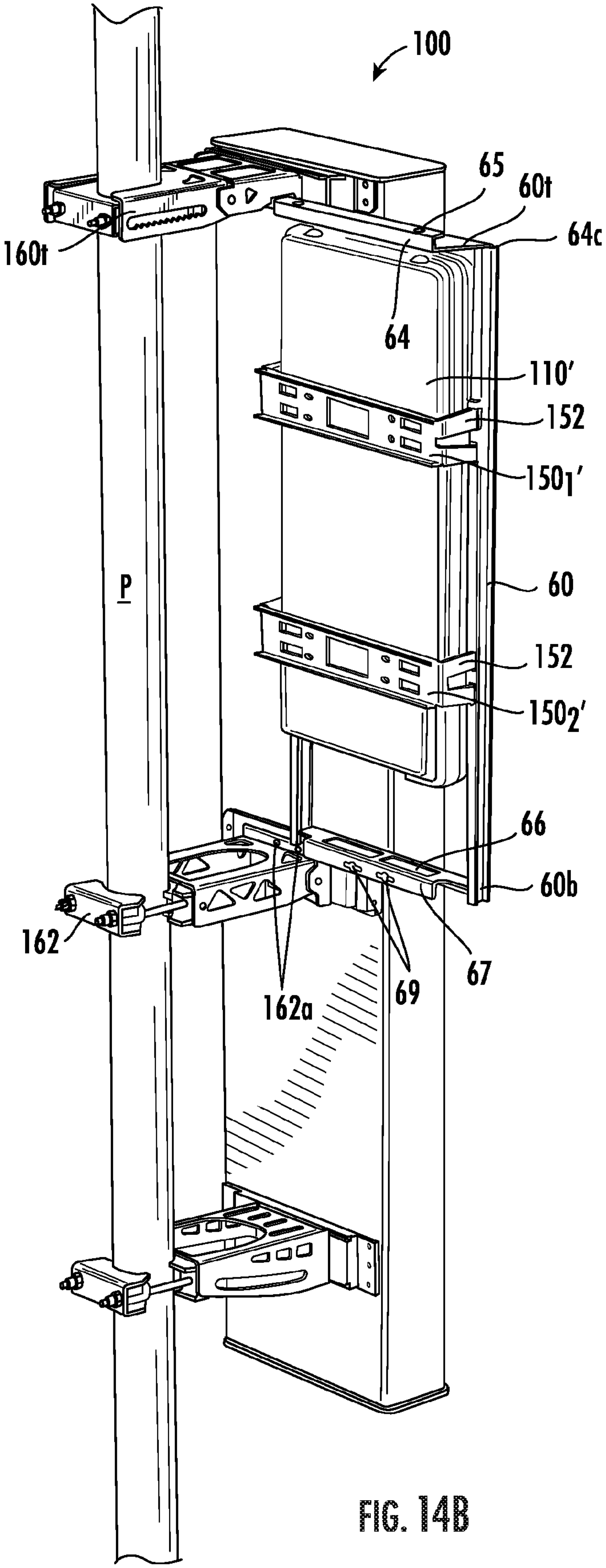
Figure 14C:
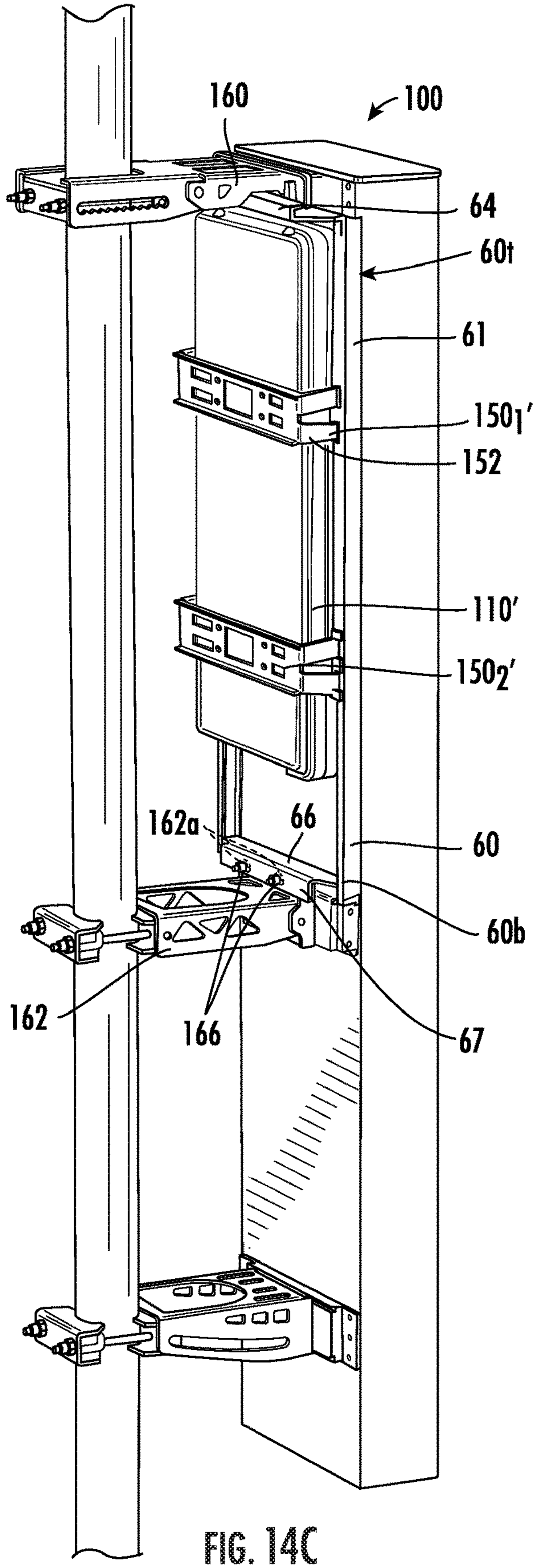

Turning now to FIGS. 14A-14C, an example series of actions are shown that can be used to mount an active antenna module to a base station antenna 100. An active antenna module 110 coupled to a mounting frame 60 is lifted into position, typically via a crane to align the lip 64 of the mounting frame 60 with a laterally extending ledge 160*l* provided by a first mounting structure bracket 160 that is coupled to first segment of the base station antenna 100 and to align the second segment 67 of the bottom 60*b* of the mounting frame 60 with a second mounting structure bracket 162 that is coupled to a longitudinally spaced apart second segment of the base station antenna 100. In some embodiments, the ledge 160*l* can project rearwardly away from or toward a rear 100*r* of the base station antenna housing 100*h*. In the embodiment shown, the ledge 1601 projects rearward and positions a free outer end facing the mounting pole P (as shown) or other mounting device, such as a building or tower. The ledge 160*l* can be provided in a different plane from that shown. There is no need to loosen either of the first or second mounting structure brackets 160, 162. The first mounting structure bracket 160 can comprise a tilt adjustment configuration 160*t* to adjust a tilt orientation of the base station antenna 100.

In other embodiments, the ledge 160*l* and the lip 64 can be oriented in the reverse. e.g., with the lip channel 64*c* facing backward and the ledge 160*l* projecting forward. In other embodiments, the lip 64 can be provided by the mounting structure bracket 160 and the ledge 160*l* can be provided by the mounting frame 60.

Figure 15A:
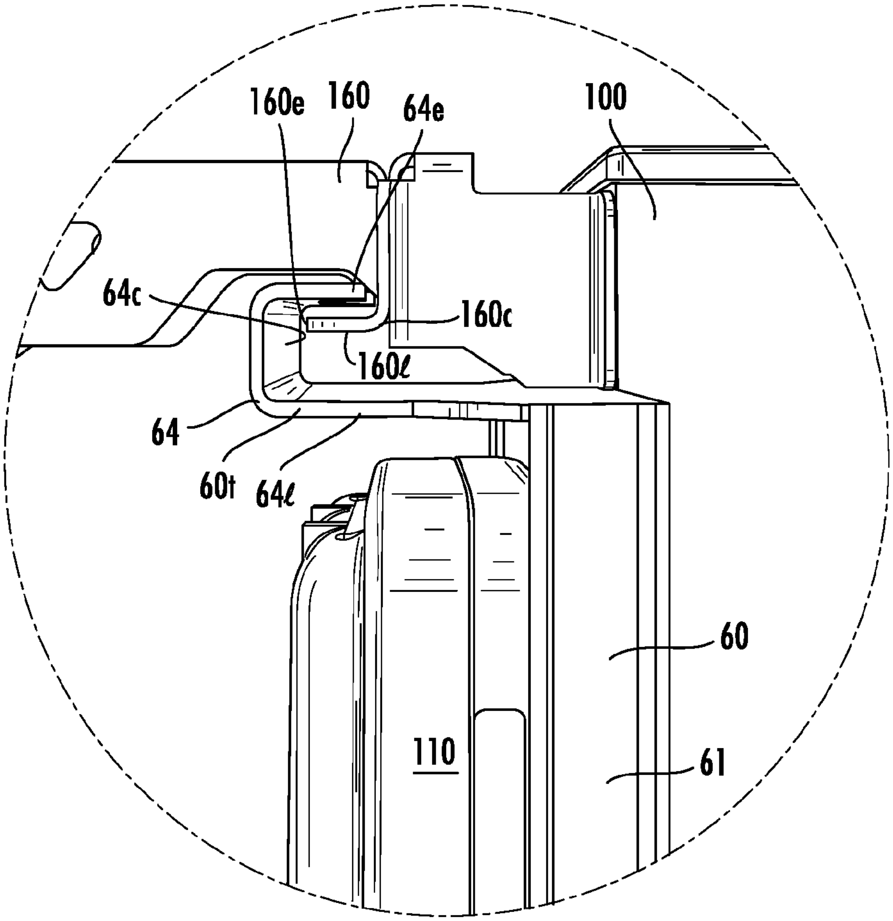
FIG. 15A is an enlarged side view of a top portion of the base station antenna and mounting structure bracket coupled to the mounting frame shown in FIGS. 14A-14C.
Figure 15B:
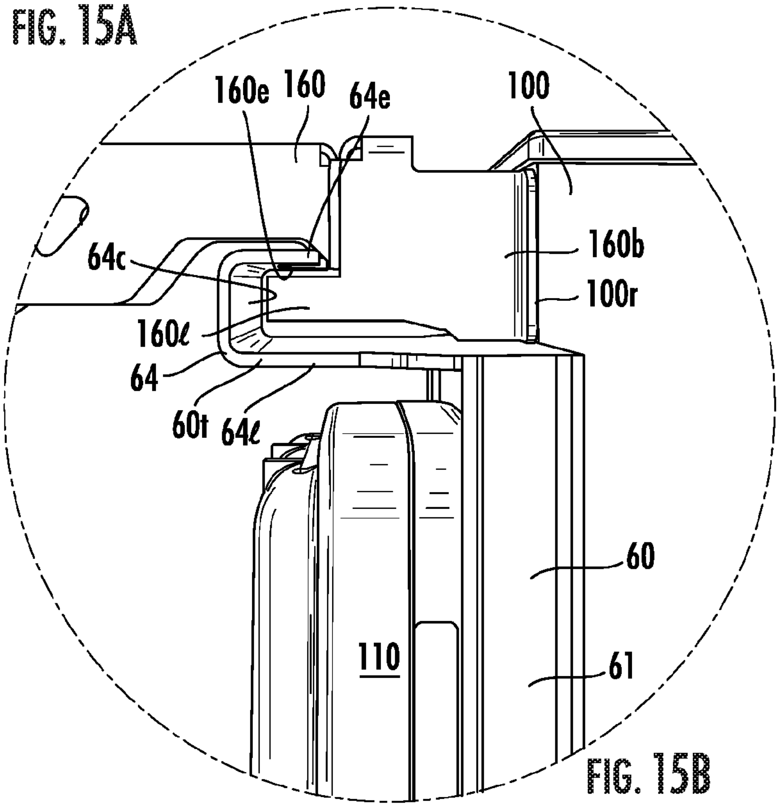
FIG. 15B is an enlarged side view of a top portion of another embodiment of the base station antenna and mounting structure bracket(s) according to embodiments of the present invention.

Referring to FIG. 15B, in some embodiments, the first mounting structure bracket 160 connecting the base station antenna 100 to the mounting structure (e.g., pole) can connect to one or more brackets 160*b* attached directly on the back side/rear 100*r* of the housing 100*h*. In some embodiments, the ledge 1601 can be provided in the bracket 160*b* attached directly to the housing 100*h* instead of being provided by the mounting structure bracket 160 attached at an opposing end to the mounting structure, e.g., pole P.

The mounting frame 60 with the active antenna module 110 can be laterally slid into a desired position over the rear 100*r* of the base station antenna 100 without requiring the removal of the base station antenna brackets 160*b* and/or mounting structure bracket 160. Fasteners 165 (FIGS. 18A-18C), such as carriage bolts or PEM inserts, can be attached to the apertures 65 in the lip 64 of the mounting frame 60 and to the apertures 69 in the bottom portion 60*b* of the mounting frame to attach the mounting frame 60 to the mounting structure brackets 160, 162. The lip 64 can be configured to provide sufficient support during installation to hold the weight of the active antenna module 110 until the fasteners 165, 166 are secured to the mounting structure brackets. The fasteners 166, 165, can be tightened (shown as at four locations) to affix the active antenna module 110 to the base station antenna 100.

Figure 15C:
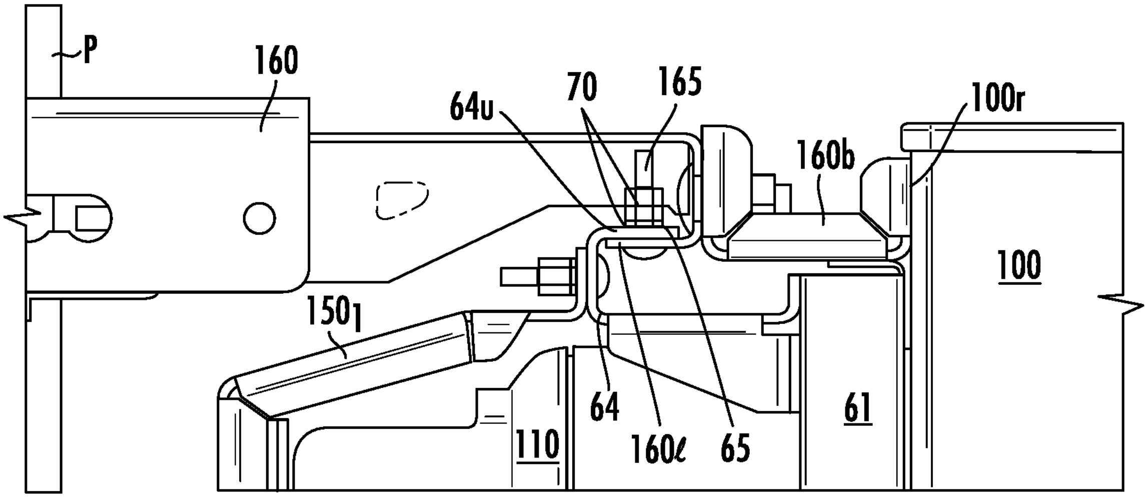
FIG. 15C is a partially transparent side view of the top portion of the mounting structure bracket and mounting frame shown in FIG. 15A.
Figure 15D:
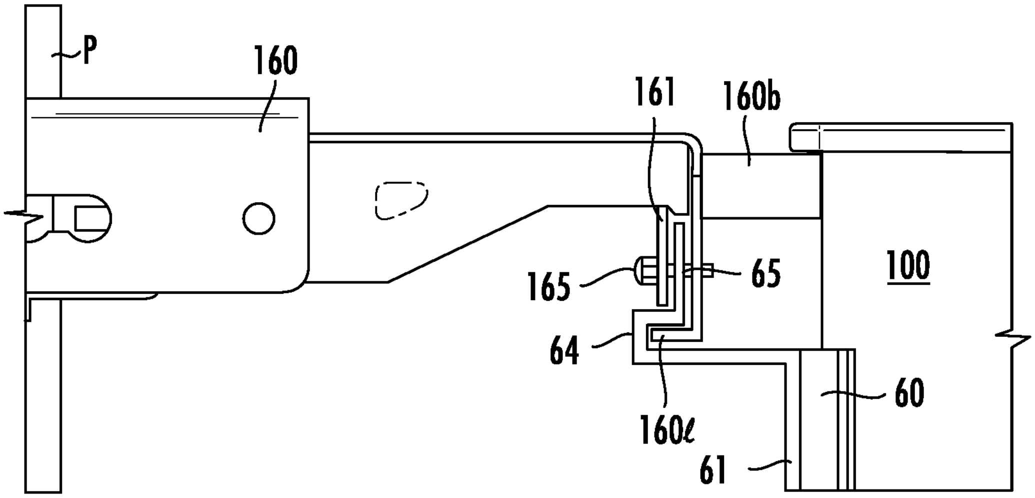
FIG. 15D is an enlarged side view of a top portion of another embodiment of the base station antenna, mounting structure bracket and mounting frame according to embodiments of the present invention.
Figure 16:
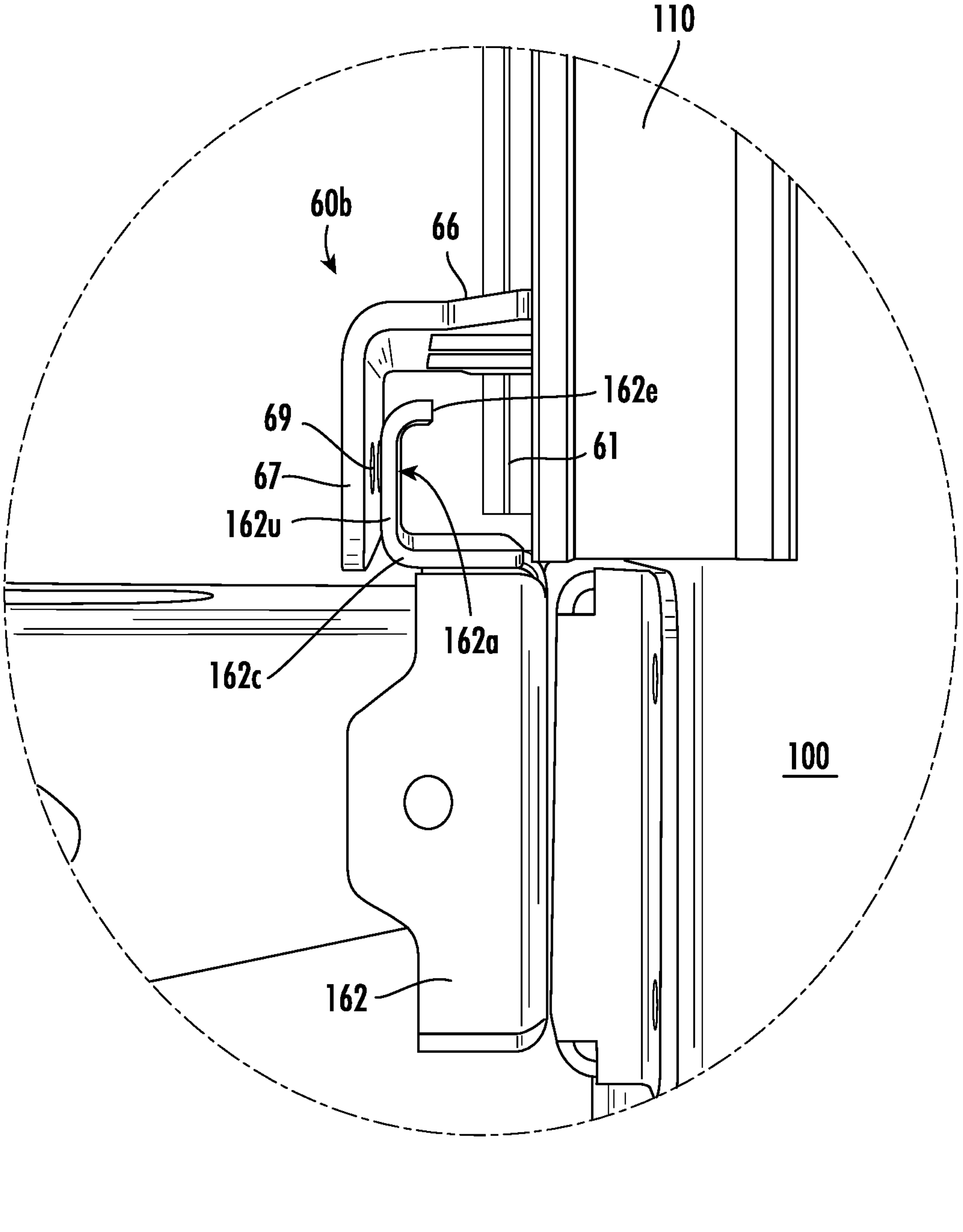
FIG. 16 is an enlarged side view of a bottom portion of the active antenna module and base station antenna, and mounting structure brackets shown in FIGS. 14A-14C.
Figure 17:
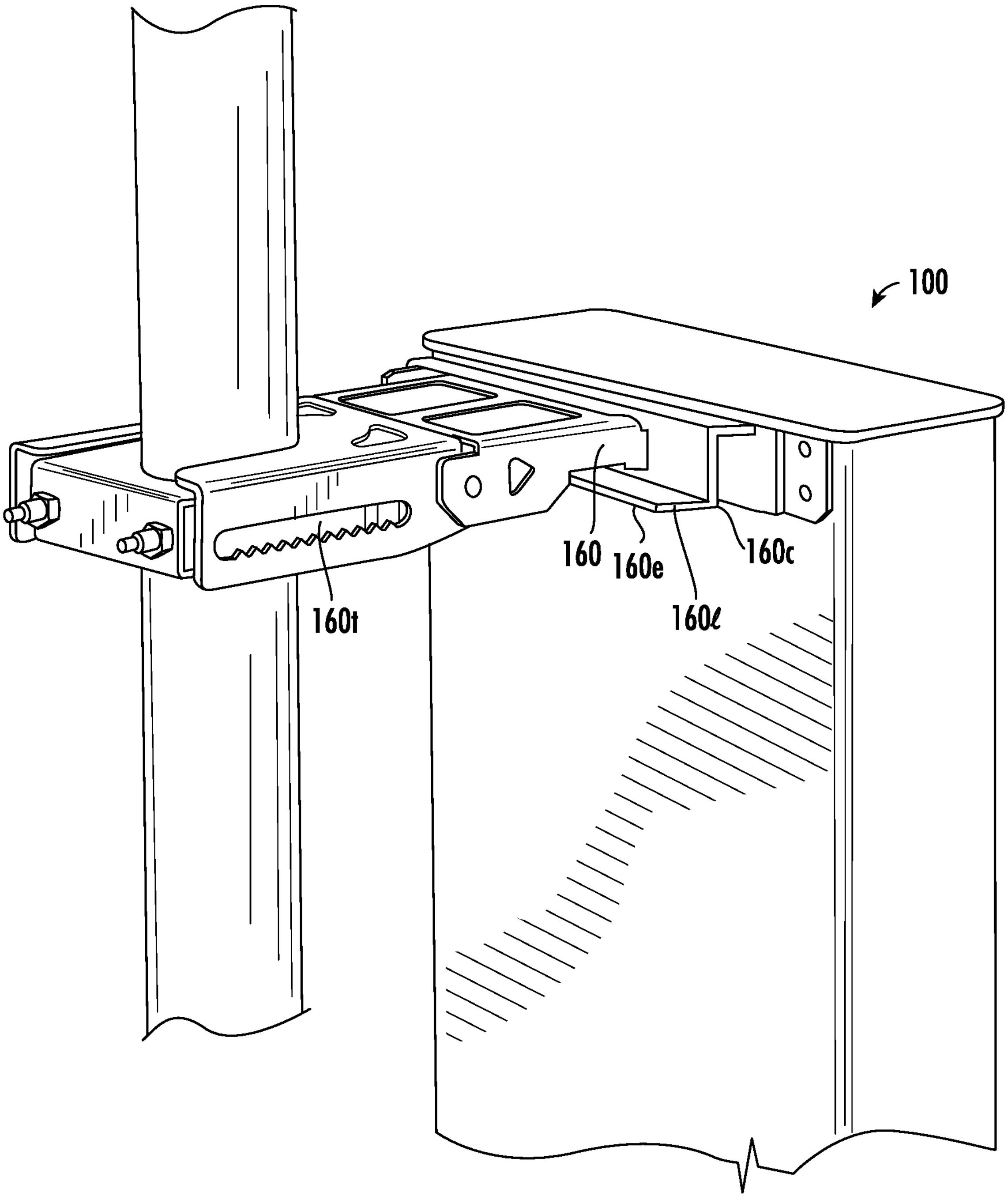
FIG. 17 is a rear perspective view of an upper portion of the base station antenna illustrating the mounting structure bracket thereof shown in FIGS. 14A-14C.

Referring to FIG. 15D, the mounting frame 60 may also be configured to provide an upwardly extending wall segment above the lip 64 with a configuration that positions the fastener apertures 65 on the wall segment that can orient the fastener(s) 165 at a horizontal orientation rather than the vertical orientation shown in FIGS. 15A-15C. The mounting structure bracket 160 can have a leg 161 with a fastener aperture that aligns with the mounting frame aperture 65 and receives the fastener(s) 165 in the horizontal orientation (when the base station housing is vertically oriented). The bracket component 160*b* can optionally provide the ledge 160*l* in the example shown or the mounting structure bracket 160 can be configured to provide the ledge 160*l* that cooperates with the channel 64*c* of the lip 64.

Referring to FIGS. 14A-14C, FIG. 15A, 15C and FIG. 17, the first mounting structure bracket 160 can provide the laterally extending ledge 160*l* that slidably receives the lip 64 of the top portion 60*t* of the mounting frame 60. The first mounting structure bracket 160 can have a segment that curves downward in a rearward direction to provide the ledge 160*l*. The ledge 160*l* can have a free end 160*e* that resides in the channel 64*c* of the lip 64 under the upper surface 64*u* of the lip 64. The free end 160*e* can reside closer to the upper surface 64*u* than the lower surface 64*l* of the lip 64. A fastener 165 can be inserted into respective apertures 65 and optionally laterally slid to engage a feature, such as a fastener aperture, in the ledge 160*l*. The fastener(s) 165 can attach (sandwich) a wall segment of the mounting frame 60 and the ledge 1607.

One or more of the contact interface surfaces of the mounting frame 60 of the mounting structure brackets 160, 161 or ledge 160*l*, can comprise an electrically insulating material such as rubber, plastic, polymer or copolymer material provided between metal contact surfaces to avoid or reduce metal-to-metal contact between the mounting frame 60 and the bracket 160 and/or bracket 162. For example, the ledge 160*l* or a wall segment of the mounting frame 60, optionally wall segment(s) of the channel 64*c*, can comprise the insulating material, such as plastic, rubber, a polymer or copolymer contact surface to avoid metal-to-metal contact conditions to avoid/reduce PIM. The rubber, polymer or plastic surfaces can be provided as a discrete member attached to a metal surface, a coating on the metal surface or an overmolding, for example. The insulating material may be lubricious or otherwise sufficiently low friction to promote the ease of sliding the mounting frame 60 into position.

Figure 5B:
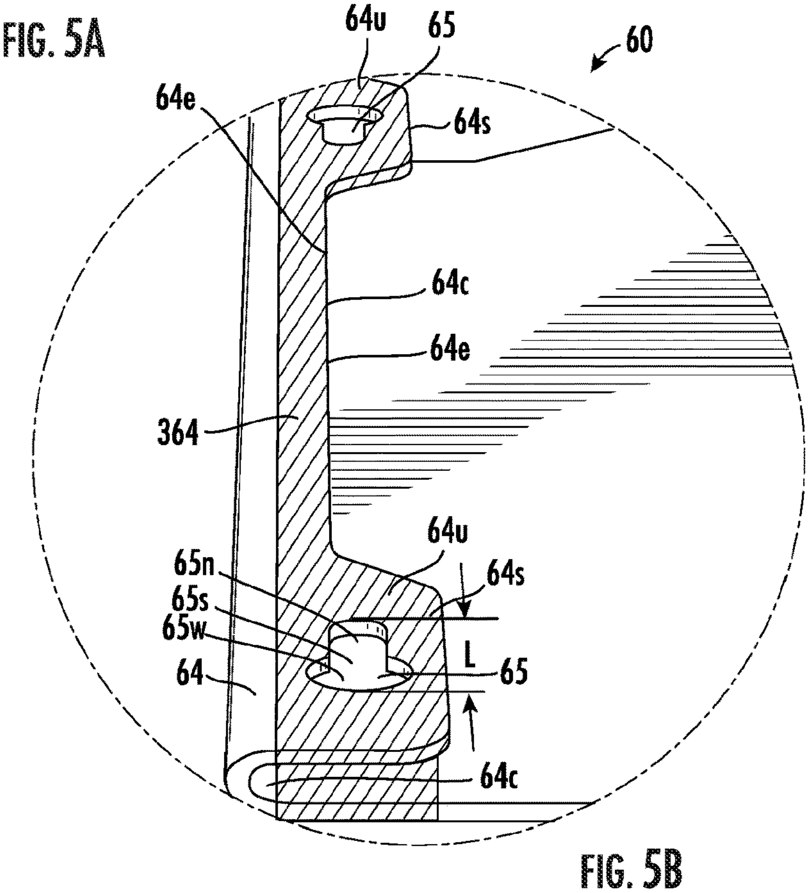
FIG. 5B is a greatly enlarged perspective view of another embodiment of the top portion of the mounting frame shown in FIG. 3A according to embodiments of the present invention.
Figure 5C:
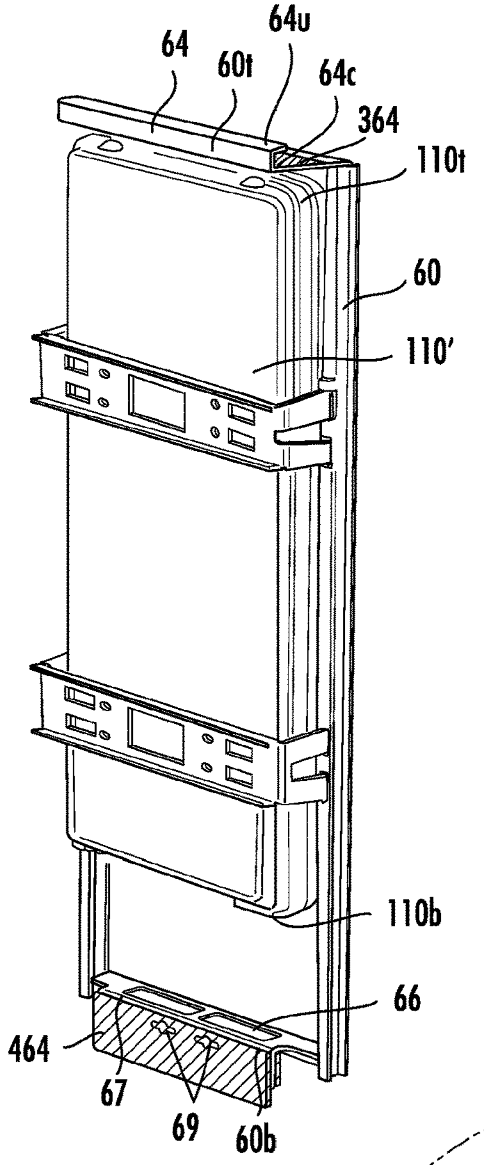
FIG. 5C is a rear perspective view of another embodiment of the mounting frame shown in FIG. 3A according to embodiments of the present invention.

Referring to FIG. 5B, an example embodiment of the above is shown. The top portion 60*t* of the mounting frame 60 can include an electrical insulating material 364 which can be formed onto one or more of the metal surfaces forming the channel 64*c*, including an upper or lower surface inside the channel 64*c* and optionally extending laterally outward over an end edge at the end of the channel 64*c*. That is, the electrically insulating material 364 can be on the underside of the upper surface 64*u* and can surround the apertures 65 and can hook over the top of the channel 64*c* as the mounting frame 60 can slide onto the ledge 160*l* of the mounting structure bracket 160 or bracket 160*b* or vice versa. The material 364 can go around the end of the channel 64*c* so that when sliding laterally inward onto the ledge 160*l*, there is no metal-on-metal contact between these two components. FIG. 5C shows that electrical insulating material 464 can also be provided on at least one primary surface of the wall segment 67 and the fastener apertures 69 can extend through both the metal and the electrically insulating material 464. Thus, the material 464 can be positioned between the bracket 162 and the wall segment 67.

Referring to FIGS. 14A-14C and FIG. 16, the second mounting structure bracket 162 can comprise an upwardly projecting segment 162*u* with fastener apertures 162*a* that are sized and configured to align with the fastener apertures 69 provided by the bottom 60*b* of the mounting frame 60. The upwardly projecting segment 162*u* can extend from a curved bend in a lower segment thereof. The upwardly projecting segment 162*u* can have a free end 162*e* that can be orthogonal to the upwardly projecting segment 162*u* and can face the mounting frame 60 and/or that faces the rear 100*r* of the base station antenna 100. The bend in the upper portion providing the free end 162*e* may provide increased structural rigidity relative to a configuration that has a free end that terminates without a bent upper end forming the free end. The upwardly projecting segment 162*u* can reside forward or rearward of the second segment 67 of the bottom portion 60*b* of the mounting frame 60. In the embodiment shown in FIG. 16, the upwardly projecting segment 162*u* is forward of and adjacent to the second segment 67.

Figure 18A:
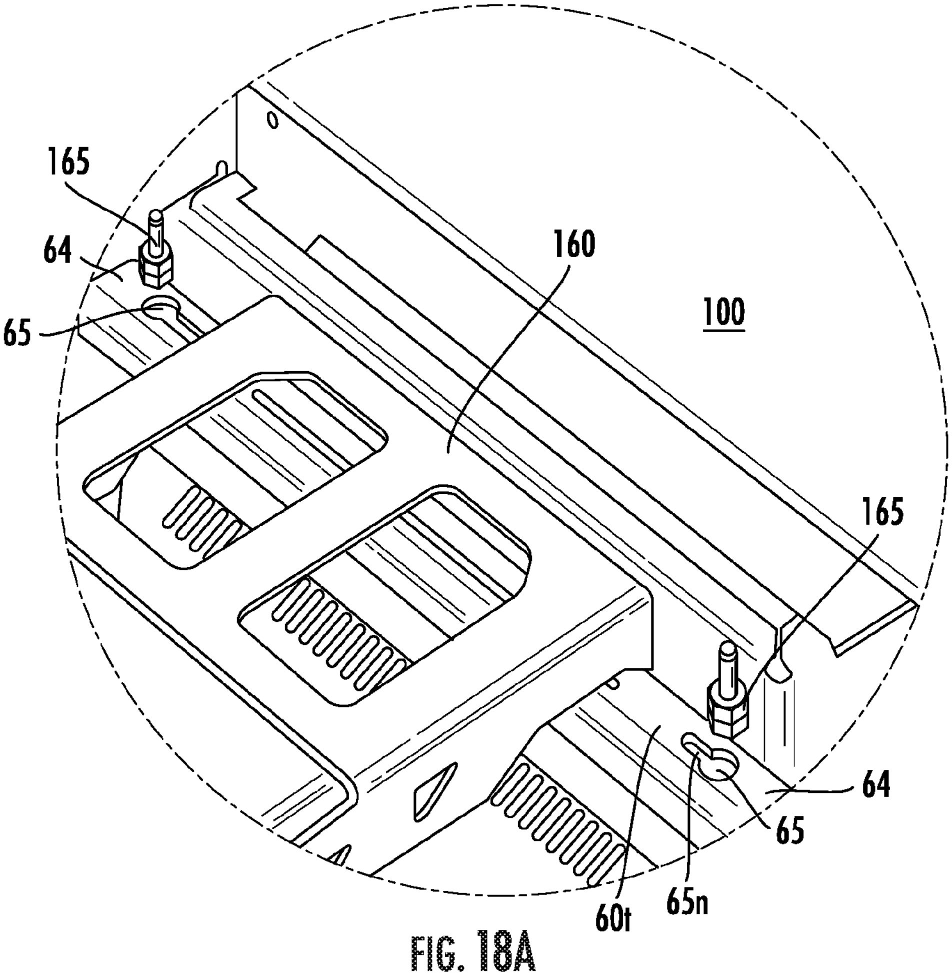
FIG. 18A is an enlarged rear perspective view of a top portion of the base station antenna with the mounting structure bracket shown in FIG. 17 and the top portion of the mounting frame according to embodiments of the present invention.
Figure 18B:
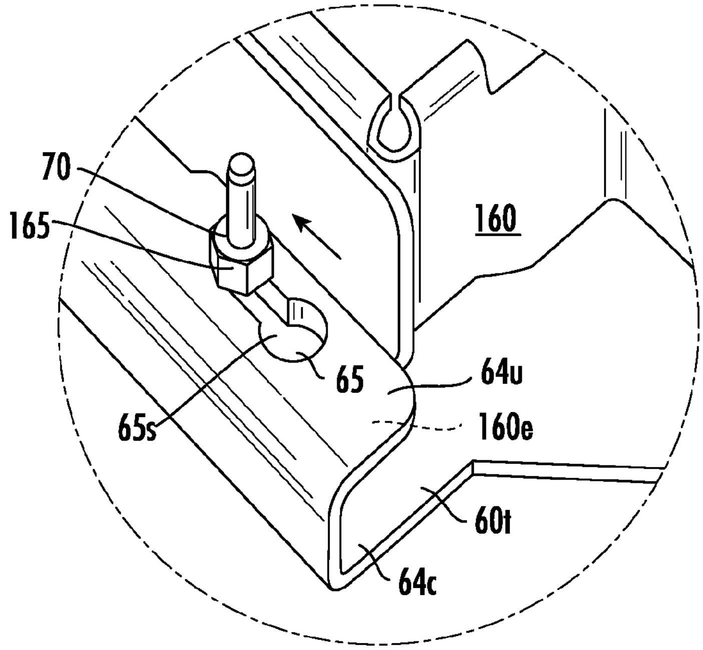
FIG. 18B is an enlarged rear perspective view of the shaped slot in the top portion of the mounting frame coupled to the fastener shown in FIG. 18A according to embodiments of the present invention.
Figure 18C:
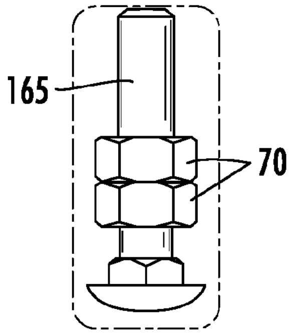
FIG. 18C is an enlarged side view of the fastener shown in FIGS. 18A and 18B.

FIGS. 18A-18C illustrate that the fasteners 165 can be inserted into the apertures 65, then slid laterally inward to the narrow segment 65*n* of the slot 65*s* and tightened to lock into position, one or more nuts 70 and a washer above the upper surface 64*u*, optionally with one or more nuts 70 below the upper surface 64*u*. FIG. 15A illustrates one nut above and one nut below. FIG. 15C illustrates a pair of nuts above the upper surface 64*u*.

The active antenna module 110 can be mounted while the base station antenna 100 is operative, such as operative for 4G operation, which can be independent of 5G operation. The active antenna module 110 can be configured to add 5G operational capability to the base station antenna 100 without requiring a separate base station antenna 100. The base station antenna 100 may be powered down during installation but the base station 100 can remain erect and does not require the loosening or removal of any fasteners or members attached thereto prior to installation of the active antenna module 110 with the mounting frame 60.

Figure 19:
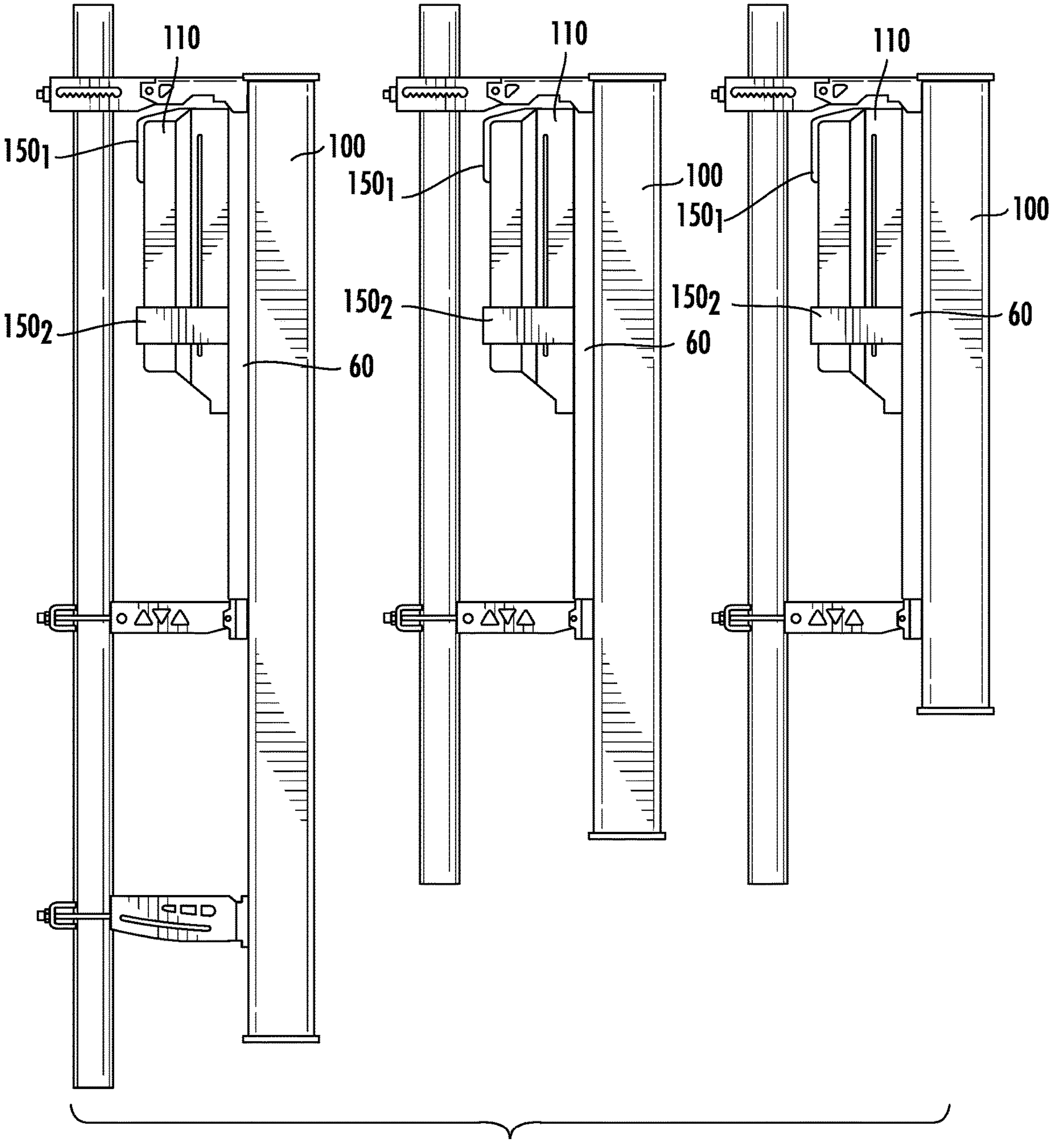
FIG. 19 are side views of example base station antennas of different lengths coupled to a respective active antenna module using a common configuration of a mounting frame according to embodiments of the present invention.

FIG. 19 illustrates that the mounting frame 60 can be used with different lengths of base station antennas 100 to couple active antenna modules 110.

Figure 20C:
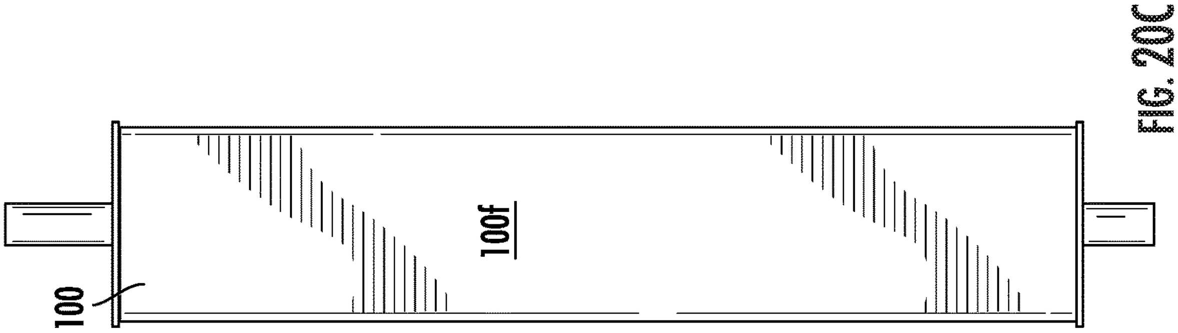
FIG. 20C is a front view of the example base station antenna shown in FIG. 20A.
Figure 20B:
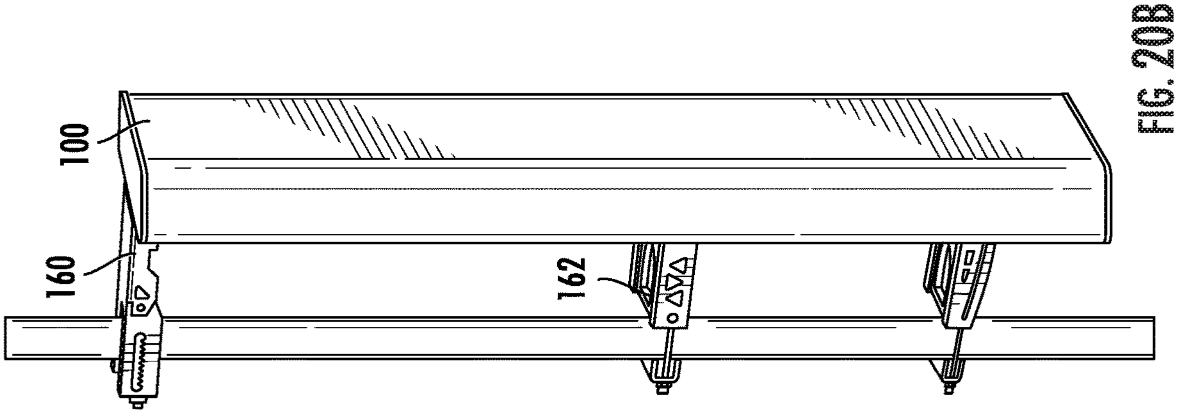
FIG. 20B is a side perspective view of the example base station antenna shown in FIG. 20A.
Figure 20A:
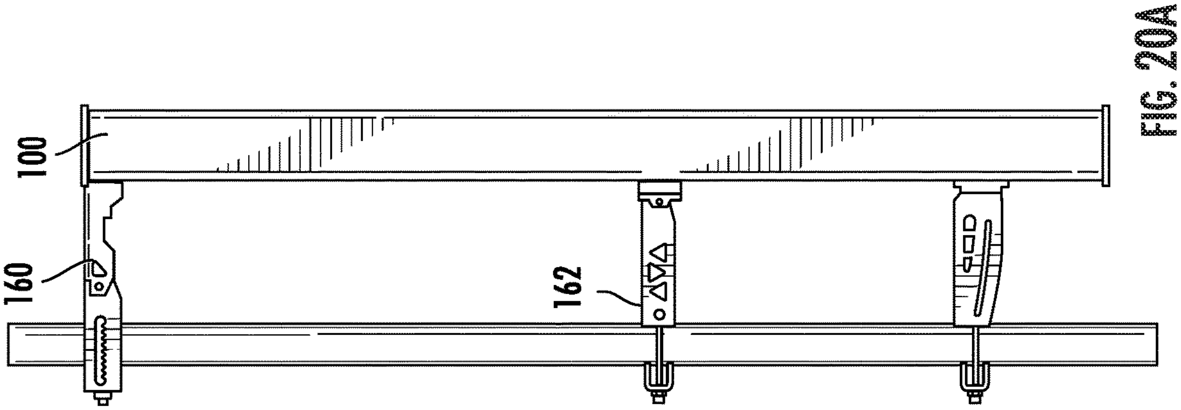
FIG. 20A is a side view of an example base station antenna according to embodiments of the present invention.
Figure 21C:
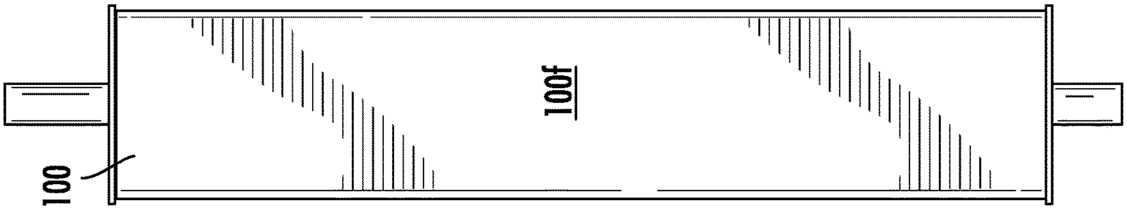
FIG. 21C is a front view of the example base station antenna shown in FIG. 21A.
Figure 21B:
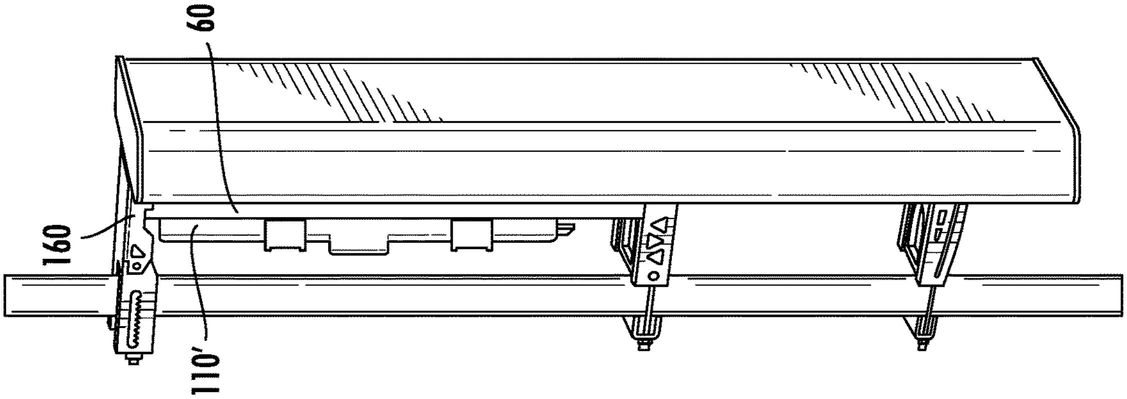
FIG. 21B is a side perspective view of the example base station antenna shown in FIG. 21A.
Figure 21A:
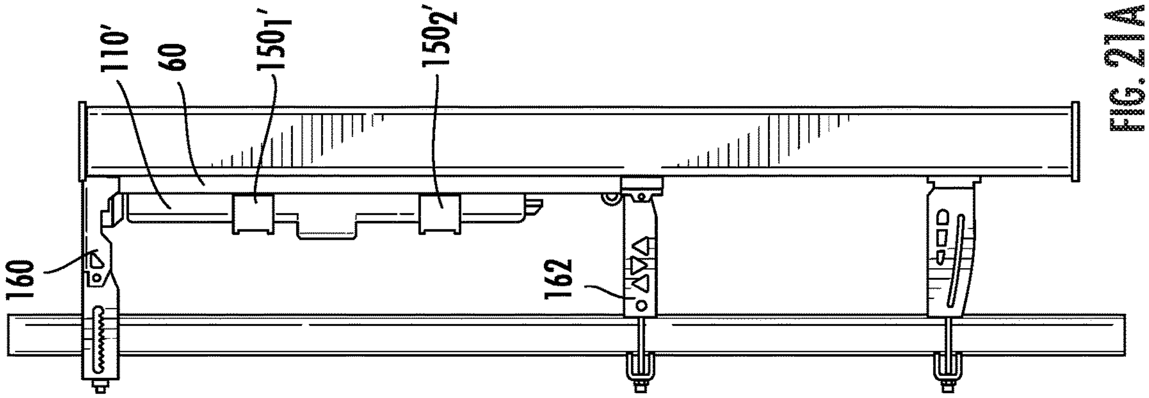
FIG. 21A is a side view of an example base station antenna according to embodiments of the present invention.
Figure 22C:
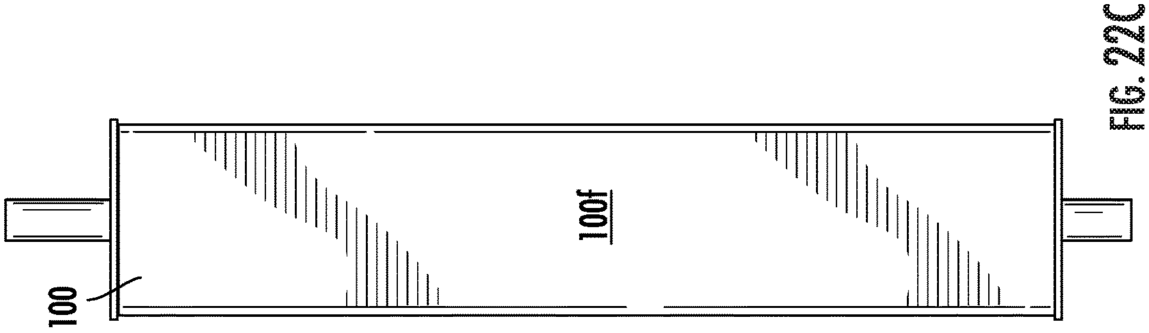
FIG. 22C is a front view of the example base station antenna shown in FIG. 22A.
Figure 22B:
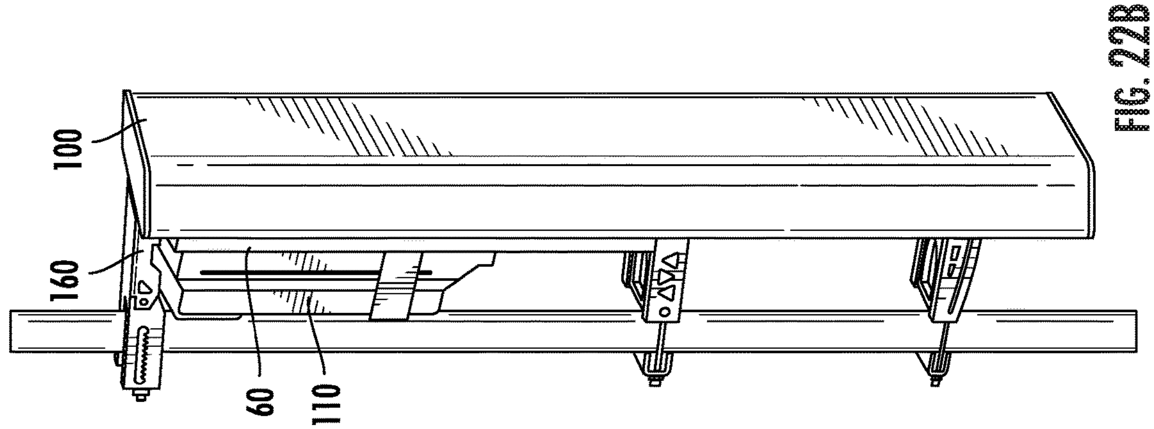
FIG. 22B is a side perspective view of the example base station antenna shown in FIG. 22A.
Figure 22A:
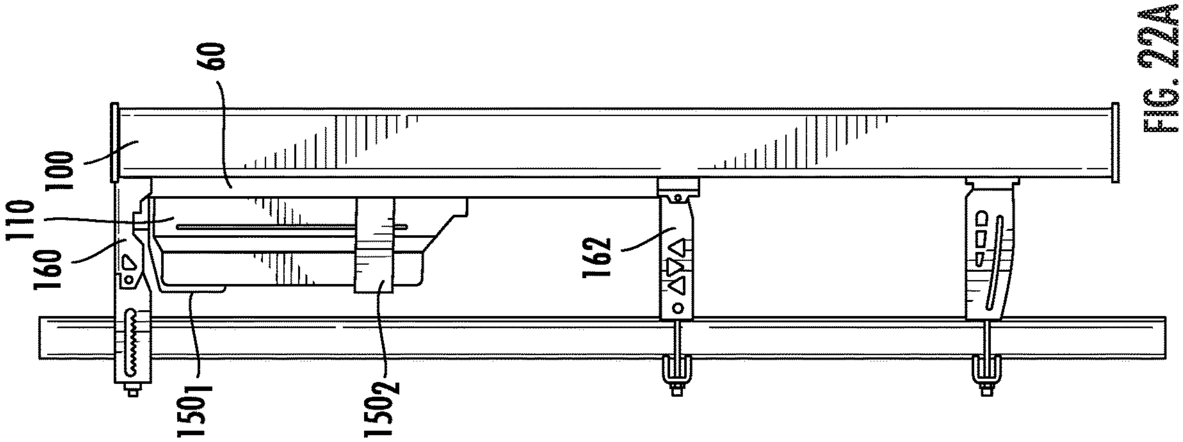
FIG. 22A is a side view of an example base station antenna according to embodiments of the present invention.

FIGS. 20A-20C illustrate a base station antenna 100 without an active antenna module and with the mounting structure brackets 160, 162. FIGS. 21A-21C illustrate the base station antenna 100 with a mounting frame 60 coupled to a low-profile active antenna module 110' while FIGS. 22A-22C show the base station antenna 100 with the mounting frame 60 coupled to a larger (in a front to back direction) active antenna module 110.

Different active antenna modules 110 may be configured to have different radios, radiating elements or other components whereby the active antenna modules 110 can be different for different cellular service providers and even for the same cellular provider. The active antenna module 110 can be interchangeably replaced with another active antenna module 110 from the original equipment manufacturer (OEM) or from the same cellular communications service provider or from different cellular communications service providers. Thus, a plurality of different active antenna modules 110 that have different configurations, including different internal configurations and different external configurations, can be interchangeably coupled to the base station antenna housing 100*h*. The different active antenna modules 110 can each have the same exterior (perimeter) footprint and connectors or may have different exterior footprints and/or connectors. The different active antenna modules 110 can have different depth dimensions (front to back) and/or different width (lateral) dimensions. A respective base station antenna 100 can, for example, accept different active antenna modules 110 from different service providers at a field installation and/or factory installation site using different adapter members or other mounting configurations that allow the interchangeable field installation/assembly. The base station antenna 100/antenna housing 100*h* can thereby allow different active antenna modules 110 to be interchangeably installed, upgraded, or replaced. The base station antenna 100 can concurrently hold first and second active antenna units 110, one above the other, in some embodiments.

Referring to FIG. 23, the base station antenna 100 can include a reflector 170 that has right and left side reflector segments 170*r*, 170*l* (the orientation defined when viewed from a front 100*f* of the base station antenna 100) that extend in a longitudinal direction, optionally with an open space across at least part of active antenna module 110 and/or with a frequency selective surface in front of the radiating elements 1195 of the active antenna module 110. The reflector 170 can be an extension of or coupled to a primary or main reflector 214 of the passive antenna assembly 190 (FIG. 24).

Thus, a reflector, such as one or both of the passive reflector 170 and/or the active reflector 1172*r*, of the base station antenna 100, can reside behind at least some radiating elements and can selectively reject some frequency bands and permit other frequency bands to pass therethrough by including the frequency selective surface and/or substrate to operate as a type of "spatial filter". See, e.g., Ben A. Munk, Frequency Selective Surfaces: Theory and Design, ISBN: 978-0-471-37047-5; DOI: 10.1002/0471723770; April 2000, Copyright (C) 2000 John Wiley & Sons, Inc. the contents of which are hereby incorporated by reference as if recited in full herein. For additional discussion of example configurations of the frequency selective surface embodiments, see co-pending U.S. patent application Ser. No. 17/209,562 filed Mar. 23, 2021, the contents of which are hereby incorporated by reference as if recited in full herein.

The base station antenna 100 can include at least one radome positioned between the (passive) reflector 170 and the active antenna module 110. For example, referring to FIG. 23, the active antenna module 110 can include a radome 119 at a front 110*f* thereof, that resides in front of a mMIMO antenna array 1195. The passive antenna assembly 190 can include a radome 1129 that resides in front of the radome 119 of the active antenna module 110.

Thus, in some embodiments, the base station antenna 100 can be configured with a first radome 119 and a second radome 1129, spaced apart in a front to back direction. The first radome 119 can be the front 110*f* part of the active antenna module 110 and be configured to seal the active antenna module 110. The second radome 1129 can be configured to be a skin or middle/intermediate radome 1129 and can be configured to seal the base station antenna housing 100*h* comprising the passive antenna assembly 190.

FIG. 23 illustrates that (the passive antenna assembly 190 of) the base station antenna 100 can include low band radiating elements 222 with respective angled feed stalks 222*f* projecting forward of the reflector 170, in front of the active antenna module 110, and extending laterally inward at an angle that is parallel to or that is between 20-80 degrees from horizontal. Note that the low-band radiating elements 222 may (partially) extend in front of the outer columns of high-band radiating elements 1195 of the active antenna module 110. Any of the feed stalk designs disclosed in U.S. Provisional Patent Application Ser. No. 63/087,451, filed Oct. 5, 2020 ("the '451 application") may be used to implement the angled feed stalks 222*f*. The entire content of the '451 application is incorporated herein by reference as if set forth in its entirety. However, it is also contemplated that angled feed stalks 222*f* are not required and conventional configurations of same may be used.

The passive antenna assembly 190 of the base station antenna 100 can include low-band radiating elements 222 and/or mid-band radiating elements 232 with one or more of low-band feed stalks 222*f* projecting laterally inward from a side segment 170*s* of the reflector 170 and forward of the reflector 170, in front of the active antenna module 110. Again, note that the low-band radiating elements 222 may (partially) extend in front of the outer columns of high-band (mMimo) radiating elements 1195 of the active antenna module 110. This configuration may allow improved spacing and/or alternative configurations of the front of the active antenna module 110.

The active antenna module 110 includes radio circuitry. The active antenna module 110 can comprise a radio unit 1120. The active antenna module 110 can also include a filter and calibration printed circuit board assembly, and may also include phase shifters, which may alternatively be part of the filter and calibration assembly. The radiating elements 1195 can be provided as a massive MIMO array. The radiating elements 1195 can project forward of a multi-layer printed circuit board 1172*p* providing a ground plane 1172*g* and defining a reflector or a metal reflector 1172*r*.

The radio unit 1120 typically includes radio circuitry that converts base station digital transmission to analog RF signals and vice versa. One or more of the radio unit 1120, the antenna assembly or the filter and calibration assembly can be provided as separate sub-units that are attachable (stackable). The radio unit 1120 and the antenna assembly can be provided as an integrated unit, optionally also including the calibration assembly. Where configured as sub-units, different sub-units can be provided by OEMs or cellular service providers while still using a common base station antenna housing 100*h* and passive antenna assembly 190 thereof.

FIG. 24 is a front view of the passive antenna assembly 190 of base station antenna 100 (with the active antenna module 110 mounted thereon). The active antenna module 110 typically resides entirely behind and external to the rear surface 100*r* of the base station antenna 100 but can alternatively project forward into a recess 155 provided by the rear surface 100*r*. As shown, the antenna assembly 190 includes a main backplane 210 that has side walls 212 and a main reflector 214. The backplane 210 may serve as both a structural component for the antenna assembly 190 and as a ground plane and reflector for the radiating elements mounted thereon. The backplane 210 may also include brackets or other support structures (not shown) that extend between the side walls 212 along the rear of the backplane 210. Various mechanical and electronic components of the antenna 100 are mounted between the side walls 212 and the back side of the main reflector 214, such as phase shifters, remote electronic tilt units, mechanical linkages, controllers, diplexers, and the like as is well known in the art.

The main backplane 210 defines a main module of the passive antenna assembly 190. The main reflector 214 may comprise a generally flat metallic surface that extends in the longitudinal direction L of the antenna 100. The main reflector 214 can be the (passive) reflector 170 discussed above or can be an extension of, coupled to or different from the (passive) reflector 170 discussed above. If the main reflector 214 is a separate reflector it is (electrically) coupled to the reflector 170 to provide a common electrical ground.

Some of the radiating elements (discussed below) of the antenna 100 may be mounted to extend forwardly from the main reflector 214, and, if dipole-based radiating elements are used, the dipole radiators of these radiating elements may be mounted, for example, approximately ¼ of a wavelength of the operating frequency for each radiating element forwardly of the main reflector 214. The main reflector 214 may serve as a reflector and as a ground plane for the radiating elements of the antenna 100 that are mounted thereon.

Still referring to FIG. 24, the base station antenna 100 can include one or more arrays 220 of low-band radiating elements 222, one or more arrays 230 of first mid-band radiating elements 232, one or more arrays 240 of second mid-band radiating elements 242 and one or more arrays 250 of high-band radiating elements 1195. The arrays 250 can be provided as high band radiating elements for an active array or a mMIMO array in the active antenna module 110. The radiating elements 222, 232, 242, 1195 may each be dual-polarized radiating elements. Further details of radiating elements can be found in co-pending WO2019/236203 and WO2020/072880, the contents of which are hereby incorporated by reference as if recited in full herein.

The low-band radiating elements 222 are mounted to extend forwardly from the main or primary reflector 214 (and/or the reflector 170) and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHZ frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays 220-1, 220-2 may be used to transmit and receive signals in the 700 MHZ (or 800 MHZ) frequency band.

The first mid-band radiating elements 232 may likewise be mounted to extend forwardly from the main reflector 214 and may be mounted in columns to form linear arrays 230 of first mid-band radiating elements 232. The linear arrays 230 of mid-band radiating elements 232 may extend along the respective side edges of the main reflector 214. The first mid-band radiating elements 232 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements 232 are configured to transmit and receive signals in the lower portion of the second frequency band (e.g., some or all of the 1427-2200 MHz frequency band). The linear arrays 230 of first mid-band radiating elements 232 may be configured to transmit and receive signals in the same portion of the second frequency band or in different portions of the second frequency band and may extend substantially the full length of the antenna 100 in some embodiments.

The second mid-band radiating elements 242 can be mounted in columns in the lower medial portion of antenna 100 to form linear arrays 240 of second mid-band radiating elements 242. The second mid-band radiating elements 242 may be configured to transmit and receive signals in the second frequency band. In the depicted embodiment, the second mid-band radiating elements 242 are configured to transmit and receive signals in an upper portion of the second frequency band (e.g., some, or all, of the 2300-2700 MHZ frequency band). In the depicted embodiment, the second mid-band radiating elements 242 may have a different design than the first mid-band radiating elements 232.

The high-band radiating elements 1195 can be mounted in columns in the upper medial or center portion of the active antenna module 110 and/or the base station antenna 100 to form (e.g., four) linear arrays 250 of high-band radiating elements. The high-band radiating elements 1195 may be configured to transmit and receive signals in a third frequency band. In some embodiments, the third frequency band may comprise the 3300-4200 MHz frequency range or a portion thereof. The high band radiating elements 1195 can reside behind or extend into a recess 155 in the reflector 170 or behind a frequency selective surface that extends across the space depicted by the recess in FIG. 24.

In the depicted embodiment, the arrays 220 of low-band radiating elements 222, the arrays 230 of first mid-band radiating elements 232, and the arrays 240 of second mid-band radiating elements 242 are all part of the passive antenna assembly 190, while the arrays 250 of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, the two linear arrays 240 of second mid-band radiating elements 242 may be replaced with four linear arrays of ultra-high-band radiating elements that transmit and receive signals in a 5 GHz frequency band.

The low-band and mid-band radiating elements 222, 232, 242 may each be mounted to extend forwardly of and/or from the main reflector 214.

Each array 220 of low-band radiating elements 222 may be used to form a pair of antenna beams, namely an antenna beam for each of the two polarizations at which the dual-polarized radiating elements are designed to transmit and receive RF signals. Likewise, each array 232 of first mid-band radiating elements 232, and each array 242 of second mid-band radiating elements 242 may be configured to form a pair of antenna beams, namely an antenna beam for each of the two polarizations at which the dual-polarized radiating elements are designed to transmit and receive RF signals. Each linear array 220, 230, 240 may be configured to provide service to a sector of a base station. For example, each linear array 220, 230, 240 may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements 222, 232, 242, 1195 are dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

Some or all of the radiating elements 222, 232, 242, 1195 may be mounted on feed boards that couple RF signals to and from the individual radiating elements 222, 232, 242, 1195, with one or more radiating elements 222, 232, 242, 1195 mounted on each feed board. Cables (not shown) and/or connectors may be used to connect each feed board to other components of the antenna 100 such as diplexers, phase shifters, calibration boards or the like.

In some embodiments, the base station antennas 100 may be designed so that a variety of different active antenna modules 110 can be used on/in a given antenna 100. The active antenna module 110 can be manufactured by any original equipment manufacturer and/or cellular service provider and mounted on the back of the antenna. This allows cellular operators to purchase the base station antennas and the radios mounted thereon separately, providing greater flexibility to the cellular operators to select antennas and radios that meet operating needs, price constraints and other considerations.

The antennas 100 may have a number of advantages over conventional antennas. As cellular operators upgrade their networks to support fifth generation ("5G") service, the base station antennas that are being deployed are becoming increasingly complex. It is desirable to minimize antenna size and/or integrate increased number of antenna or antenna elements inside a single bases station antenna/external radome. For example, due to space constraints and/or allowable antenna counts on antenna towers of existing base stations, it may not be possible to simply add new antennas to support 5G service. Accordingly, cellular operators are opting to deploy antennas that support multiple generations of cellular service by including linear arrays of radiating elements that operate in a variety of different frequency bands in a single antenna. Thus, for example, it is common now for cellular operators to request a single base station antenna that supports service in three, four or even five or more different frequency bands. Moreover, in order to support 5G service, these antennas may include multi-column arrays of radiating elements that support active beamforming. Cellular operators are seeking to support all of these services in base station antennas that are comparable in size to conventional base station antennas that supported far fewer frequency bands.

The active antenna modules 110 may also be readily replaced in the field. As is well known, base station antennas are typically mounted on towers, often hundreds of feet above the ground. Base station antennas may also be large, heavy and mounted on antenna mounts that extend outwardly from the tower. As such, replacing base station antennas may be difficult and expensive. The active antenna modules 110 with beamforming radios may be field installable and/or replaceable without the need to detach the base station antenna 100 from an antenna mount.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed That which is claimed:

1. A base station antenna assembly, comprising:

a housing of a base station antenna comprising a passive antenna assembly and a passive reflector in the housing;

a plurality of mounting structure brackets coupled directly or indirectly to a rear of the housing and to a mounting structure;

a mounting frame coupled to the plurality of mounting structure brackets;

an active antenna module positioned at least partially between opposing long sides of the mounting frame; and at least one active antenna bracket coupled to the mounting frame and to the active antenna module whereby the mounting frame positions the active antenna module behind the housing of the base station antenna.

2. The base station antenna assembly of claim 1, wherein the mounting frame is electrically coupled to one or both of the active antenna module or the passive antenna assembly.

3. The base station antenna assembly of claim 1, wherein the mounting frame is capacitively coupled to the active antenna module.

4. The base station antenna assembly of claim 1, wherein the active antenna module comprises a massive multiple input multiple output (mMIMO) antenna array of radiating elements positioned in front of an active reflector, and wherein the passive reflector in the housing is electrically coupled to the active reflector to thereby provide a common electrical ground.

5. The base station antenna assembly of claim 1, wherein at least one of the plurality of mounting structure brackets is galvanically coupled to the passive reflector.

6. The base station antenna assembly of claim 1, wherein the long sides define or are coupled to longitudinally extending planar metal strips that are parallel to long sides of the active antenna module and sized and configured to electrically couple the active antenna module and the passive antenna assembly.

7. The base station antenna assembly of claim 1, wherein the mounting frame comprises a top portion with a laterally extending lip, wherein the plurality of mounting structure brackets comprises a first mounting structure bracket and a longitudinally spaced apart second mounting structure bracket, wherein the first mounting structure bracket comprises a laterally extending ledge that slidably cooperates with the lip.

8. The base station antenna assembly of claim 7, wherein the lip comprises an upper surface and a lower surface with a forwardly facing laterally extending channel therebetween, and wherein a laterally extending ledge of the first mounting bracket or a bracket attached thereto resides in the laterally extending channel of the lip.

9. The base station antenna assembly of claim 8, wherein the lip or a wall segment of the mounting frame adjacent to the lip comprises a plurality of spaced apart apertures, and wherein the base station antenna further comprises a plurality of fasteners, one that extends into each of the plurality of spaced apart apertures.

10. The base station antenna assembly of claim 9, wherein the plurality of spaced apart apertures comprises first and second slots that extend laterally, each with a first segment that merges into a narrower segment, and wherein, when fully installed, a first fastener of the plurality of fasteners extends into the narrower segment of the first slot and a second fastener of the plurality of fasteners extends into the narrower segment of the second slot.

11. The base station assembly of claim 1, wherein the plurality of mounting structure brackets comprises a first mounting structure bracket and a longitudinally spaced apart second mounting structure bracket, and wherein the mounting frame comprises a bottom portion comprising a plurality of laterally spaced apart fastener apertures.

12. The base station antenna assembly of claim 11, wherein the bottom portion of the mounting frame comprises a first segment that defines one or more cable routing channels and a second segment that is orthogonal to and resides below the first segment and comprises the plurality of laterally spaced apart fastener apertures, wherein the second mounting structure bracket comprises an upwardly extending projection that resides forward of the second segment of the bottom portion of the mounting frame and comprises a plurality of fastener apertures that align with the fastener apertures of the bottom portion of the mounting frame, wherein the base station antenna further comprises fasteners that extend through the fastener apertures of the bottom portion of the mounting frame and through the fastener apertures of the upwardly extending projection of the second mounting structure bracket to attach the bottom portion of the mounting frame to the second mounting structure bracket.

13. The base station antenna assembly of claim 1, wherein the at least one active antenna module bracket comprises a laterally extending bracket segment that is attached to a rear of the active antenna module and that merges into bracket arms that extend in a forward direction to couple to right and left sides of the long sides of the mounting frame.

14. The base station antenna assembly of claim 1, wherein the at least one active antenna module bracket comprises a first bracket that comprises a top portion and a bottom portion, wherein the top portion is electrically coupled to a top portion of the active antenna module and/or a top portion of the mounting frame, wherein the bottom portion is attached to a rear of the active antenna module.

15. The base station antenna assembly of claim 1, wherein the mounting frame is sized and configured to interchangeably serially couple to different configurations of active antenna modules using different configurations of the at least one active antenna module bracket to thereby provide a universal mounting system that can accommodate different active antenna modules.

16. A base station antenna assembly, comprising:

a housing comprising a passive antenna assembly and a passive reflector in the housing;

a plurality of mounting structure brackets coupled directly or indirectly to a rear of the housing and to a mounting structure;

a mounting frame coupled to the plurality of mounting structure brackets;

a housing of an antenna device positioned at least partially between opposing long sides of the mounting frame; and at least one antenna device bracket coupled to the mounting frame and to the antenna device whereby the mounting frame attaches the antenna device to the housing of the base station antenna.

17. A base station antenna assembly, comprising:

a housing of a base station antenna comprising a passive antenna assembly and a passive reflector in the housing;

an active antenna module residing behind the housing; and a mounting frame coupled to the housing and to the active antenna module, wherein the mounting frame comprises opposing long sides with the opposing long sides having a front surface, and wherein the active antenna module is positioned at least partially between the opposing long sides of the mounting frame with the front surface of the mounting frame facing the housing.

18. The base station antenna assembly of claim 17, wherein the housing comprises a plurality of rearwardly extending brackets configured to couple to a target mounting structure, and wherein the mounting frame is laterally slidable into at least one of the plurality of rearwardly extending brackets while coupled to the active antenna module.

19. A base station antenna assembly, comprising:

a housing of a base station antenna comprising a passive antenna assembly and a passive reflector in the housing;

a mounting structure bracket coupled to a rear of the housing and to a mounting structure;

an active antenna module positioned behind the housing;

a mounting frame member attached to the active antenna module and to the mounting structure bracket whereby the active antenna module is held in position behind the housing; and wherein the mounting frame comprises a pair of long sides that are laterally spaced apart, wherein the long sides have walls that project rearward a distance from a rear of the housing, and wherein the active antenna module has right and left sides that are held at least partially inside the walls of the long sides of the mounting frame.

20. The base station antenna assembly of claim 19, wherein the active antenna module comprises a massive multiple input multiple output (mMIMO) antenna array of radiating elements positioned in front of an active reflector.

21. The base station antenna assembly of claim 19, wherein the mounting frame comprises a laterally extending channel segment that slidably cooperates with a laterally extending segment of the mounting structure bracket whereby the active antenna module is configured to assemble to the mounting structure bracket by laterally sliding the mounting frame from a right or left side of the mounting structure bracket, across the mounting structure bracket into an installed position.

22. The base station antenna assembly of claim 21, wherein the mounting frame and the mounting structure bracket are secured to each other by a plurality of spaced apart fasteners.

23. The base station antenna assembly of claim 19, wherein the mounting structure bracket is attached to a top portion of the housing above the active antenna module, and wherein the mounting frame has a top portion that resides above the active antenna module and a longitudinally spaced apart lower portion that is attached to a rear of the active antenna module, and wherein the top portion of the mounting frame is attached to the first mounting structure bracket.

24. The base station antenna assembly of claim 19, wherein the mounting structure bracket is a first mounting structure bracket, the base station antenna assembly further comprising a second mounting structure bracket coupled to the rear of the housing and to the mounting structure, wherein the second mounting structure bracket resides below the first mounting structure bracket and the below the active antenna module.

25. The base station antenna assembly of claim 19, wherein the mounting structure bracket extends rearwardly, and wherein the mounting frame is configured to laterally slide into the mounting structure bracket while coupled to the active antenna module.

26. The base station antenna assembly of claim 19, the base station antenna assembly further comprising at least one active antenna bracket coupled to the long sides of the mounting frame and to the active antenna module whereby the mounting frame attaches the active antenna module to the housing of the base station antenna assembly.

* * * * *